United States Patent
Tagami et al.

(10) Patent No.: US 12,411,441 B2
(45) Date of Patent: Sep. 9, 2025

(54) TEMPERATURE DETECTION APPARATUS HAVING A BASE MEMBER THAT MOVES IN A THICKNESS DIRECTION OF A HEATER, FIXING APPARATUS, AND IMAGE FORMING APPARATUS

(71) Applicant: Canon Kabushiki Kaisha, Tokyo (JP)

(72) Inventors: Kenichi Tagami, Tokyo (JP); Noriyuki Ito, Chiba (JP); Masafumi Maeda, Kanagawa (JP); Yusuke Nakashima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 8 days.

(21) Appl. No.: 18/544,622

(22) Filed: Dec. 19, 2023

(65) Prior Publication Data

US 2024/0210859 A1 Jun. 27, 2024

(30) Foreign Application Priority Data

Dec. 21, 2022 (JP) ................. 2022-204882

(51) Int. Cl.
*G03G 15/20* (2006.01)
*G01K 1/00* (2006.01)
(Continued)

(52) U.S. Cl.
CPC ......... *G03G 15/2039* (2013.01); *G01K 1/143* (2013.01); *G01K 9/00* (2013.01);
(Continued)

(58) Field of Classification Search
CPC ........... G03G 15/2039; G03G 15/2053; G03G 15/5045; G03G 21/20; G03G 2215/00084; G03G 2215/2035; H05B 1/0241; H05B 3/0066; G01K 1/143; G01K 7/22; G01K 9/00; G01K 13/08
(Continued)

(56) References Cited

U.S. PATENT DOCUMENTS 3,690,176 A * 9/1972 Connolly ............... G01K 13/08
374/185
5,366,291 A * 11/1994 Nakagama ......... G03G 15/2039
374/208

(Continued)

FOREIGN PATENT DOCUMENTS

JP 2002181630 A 6/2002

*Primary Examiner* — Robert B Beatty
(74) *Attorney, Agent, or Firm* — Venable LLP

(57) ABSTRACT

A fixing apparatus includes a first rotary member, a nip forming member, a second rotary member, a heating element, a temperature detection element, a holder configured to hold the temperature detection element, and an urging member configured to urge the holder toward the nip forming member to bring the holder into contact with the nip forming member. The holder includes a base member configured to receive an urging force from the urging member, and a head member to which the temperature detection element is attached, the head member being configured to be in contact with the base member and tiltable with respect to the base member. The head member is configured to be urged toward the nip forming member by the urging force and to tilt following a portion of the nip forming member opposing the head member.

22 Claims, 12 Drawing Sheets

(51) Int. Cl.
    *G01K 1/143*     (2021.01)
    *G01K 9/00*     (2006.01)
    *G01K 13/00*     (2021.01)
    *G01K 13/08*     (2006.01)

(52) U.S. Cl.
    CPC ......... *G01K 13/08* (2013.01); *G03G 15/2053* (2013.01); *G03G 2215/2035* (2013.01)

(58) Field of Classification Search
    USPC .................... 399/69, 329; 219/216; 374/208
    See application file for complete search history.

(56) References Cited

U.S. PATENT DOCUMENTS

| | | | | |
|---|---|---|---|---|
| 5,937,230 | A * | 8/1999 | Iwase | G01K 13/08 |
| | | | | 374/E13.01 |
| 9,335,686 | B2 * | 5/2016 | Ohta | G03G 15/2039 |
| 2002/0071700 | A1 * | 6/2002 | Nishitani | G03G 15/2039 |
| | | | | 399/328 |
| 2003/0227533 | A1 * | 12/2003 | Yokoi | G03G 15/2053 |
| | | | | 347/156 |
| 2007/0154252 | A1 * | 7/2007 | Yoshida | G03G 21/1685 |
| | | | | 74/838 |
| 2017/0060052 | A1 * | 3/2017 | Narahara | G03G 15/2053 |
| 2017/0370781 | A1 * | 12/2017 | Yoshihara | G01K 7/22 |
| 2018/0364108 | A1 * | 12/2018 | Tanaka | G01K 7/22 |
| 2023/0168612 | A1 * | 6/2023 | Muramatsu | G03G 15/2053 |
| | | | | 399/69 |
| 2023/0244162 | A1 * | 8/2023 | Tagami | G03G 15/6555 |
| | | | | 399/328 |
| 2023/0244163 | A1 * | 8/2023 | Miyazaki | G01K 7/18 |
| | | | | 399/69 |

* cited by examiner

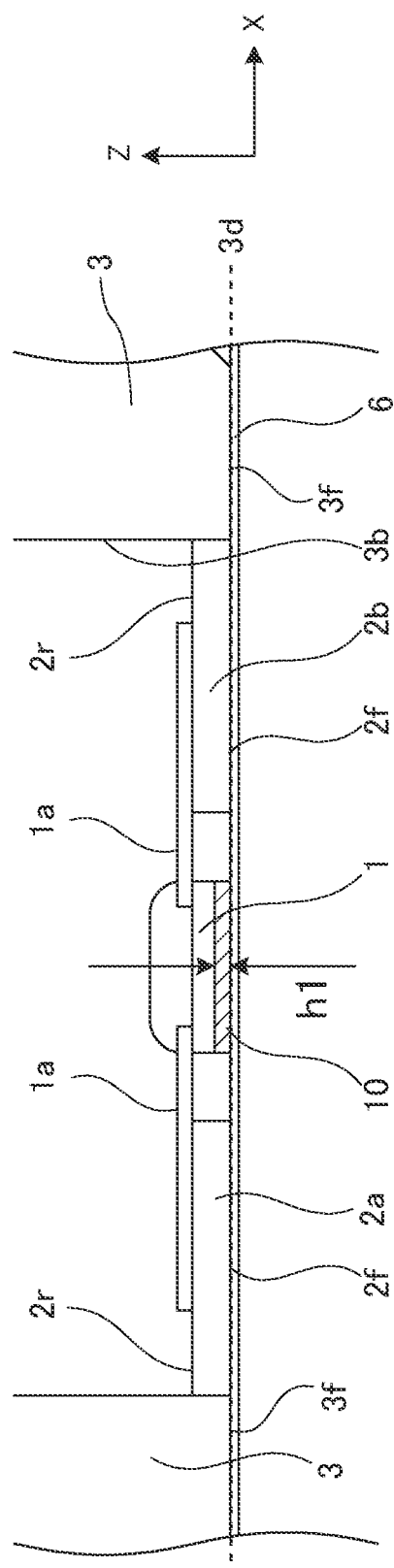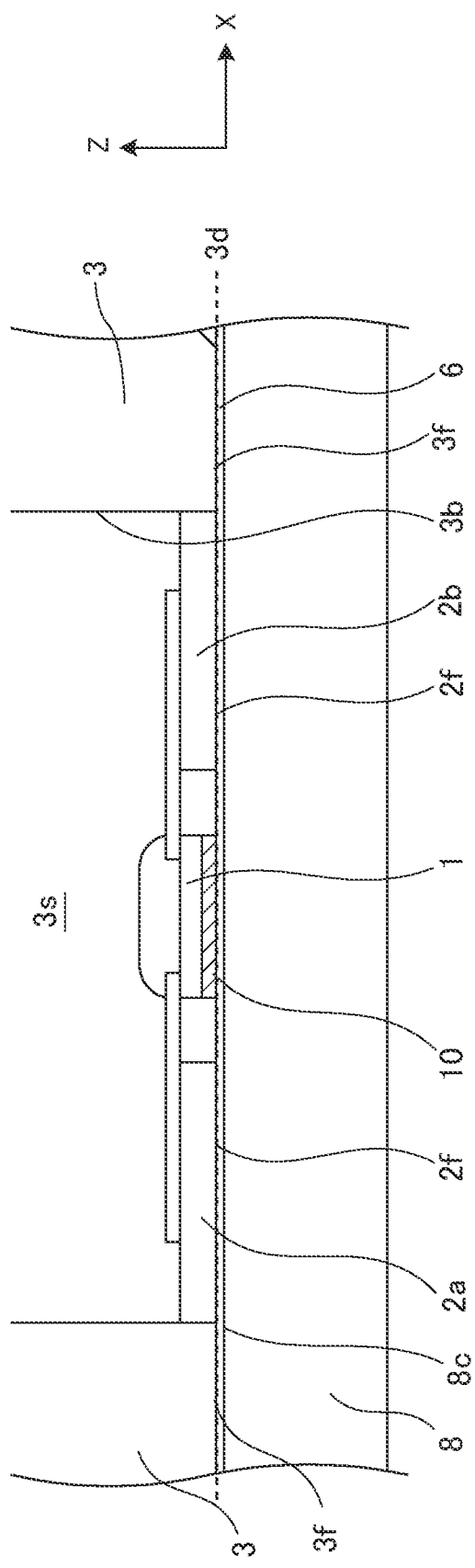

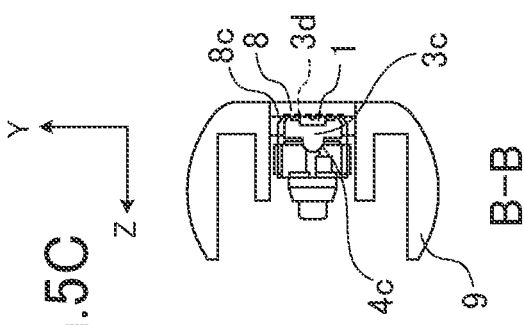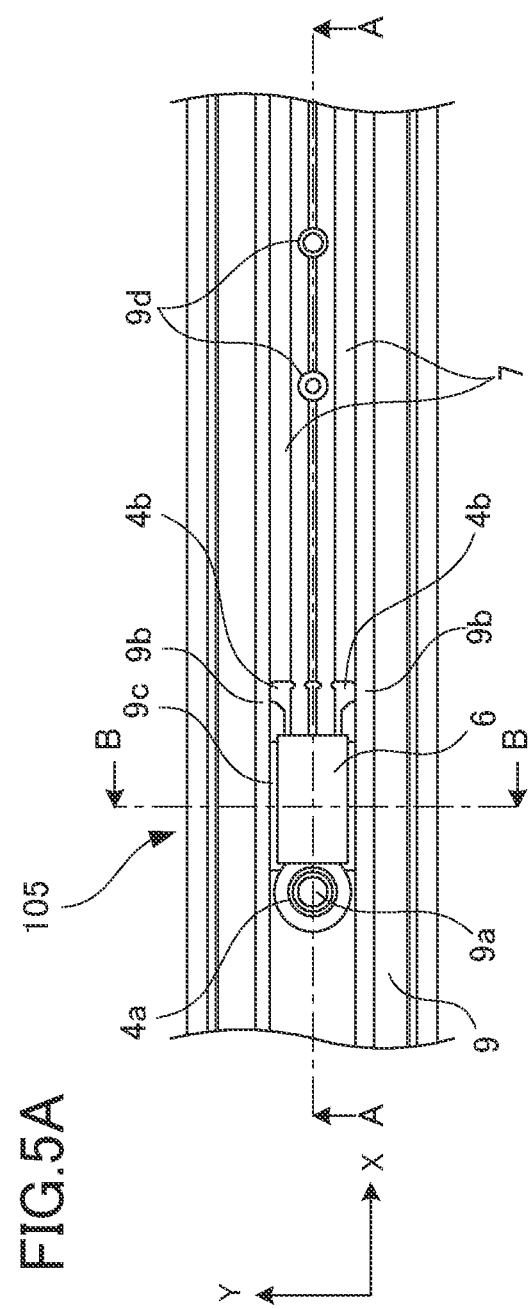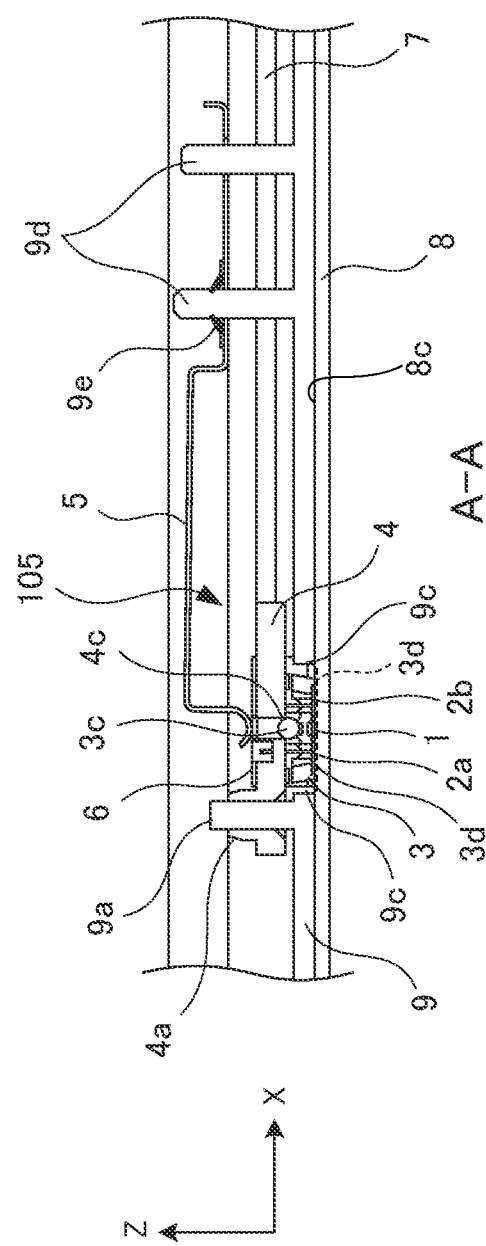

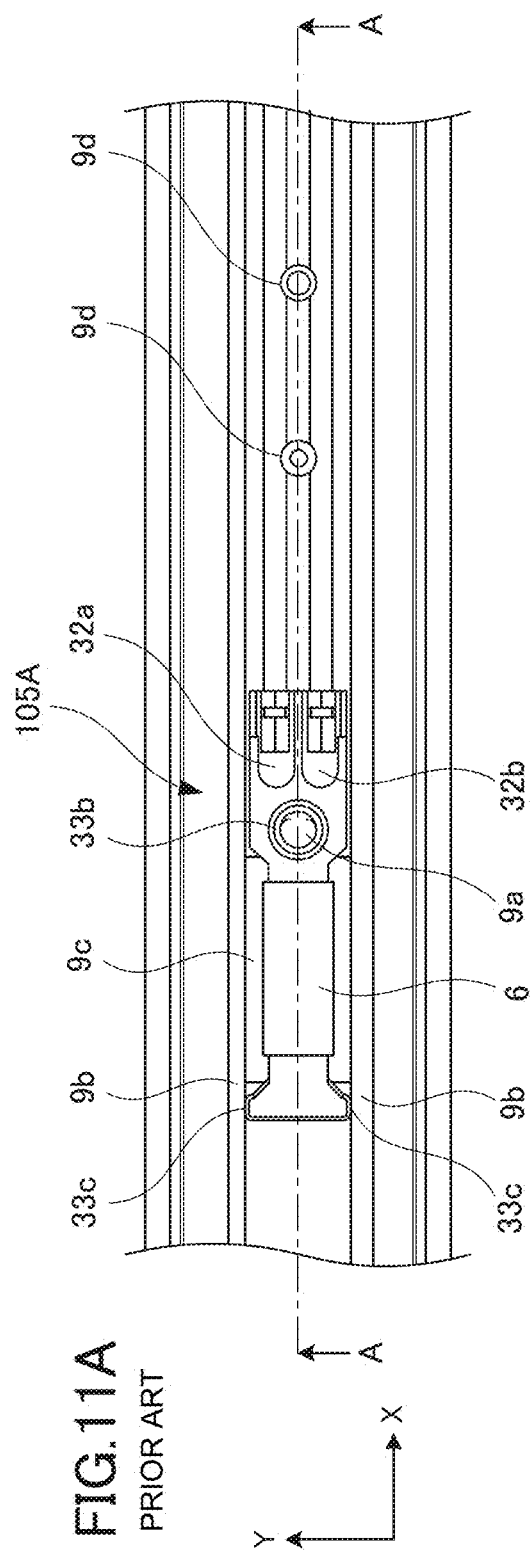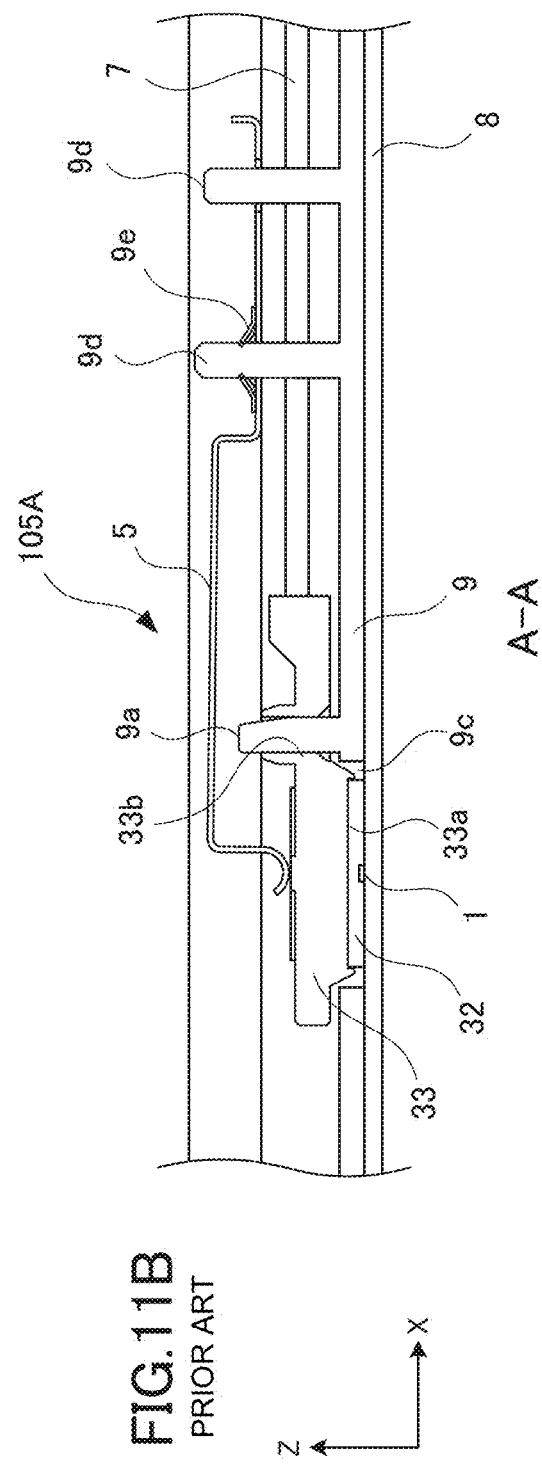

TEMPERATURE DETECTION APPARATUS HAVING A BASE MEMBER THAT MOVES IN A THICKNESS DIRECTION OF A HEATER, FIXING APPARATUS, AND IMAGE FORMING APPARATUS

BACKGROUND OF THE INVENTION

Field of the Invention

The present invention relates to a temperature detection apparatus for a fixing apparatus, a fixing apparatus that fixes an image to a recording material, and an image forming apparatus that forms an image on a recording material.

Description of the Related Art

An image forming apparatus of an electrophotographic system includes a fixing apparatus of a thermal fixation system that heats an image formed from toner and transferred onto a recording material and thus fixes the image to the recording material. The fixing apparatus of a thermal fixation system includes a temperature detection apparatus for performing temperature control, detection of abnormal heating, and the like. Japanese Patent Laid-Open No. 2002-181630 discloses a temperature detection apparatus including a heat-resistant elastic member having a lower surface on which a detection element that detects the temperature of a ceramic heater is provided, a detection element holding member that holds the upper surface of the heat-resistant elastic member, and a compression spring that urges the detection element holding member toward the ceramic heater.

In the configuration according to the document described above, since the detection element is brought into pressure contact with the ceramic heater by the elastic force of the heat-resistant elastic member, the mechanical characteristics of the heat-resistant elastic member affects the detection precision of the temperature detection apparatus. Therefore, a material for which creep deformation or denaturing is not likely to occur even in the case of being subjected to high temperature for a long period is selected as the material of the heat-resistant elastic member, but this is a factor that causes increase in the cost.

SUMMARY OF THE INVENTION

The present invention provides a temperature detection apparatus and a fixing apparatus in which positional precision of detection element can be improved with a simple configuration.

According to one aspect of the invention, a fixing apparatus is configured to fix a toner image to a recording material in a nip portion, and the fixing apparatus includes a first rotary member, a nip forming member provided in an inner space of the first rotary member, a second rotary member configured to be in contact with an outer circumferential surface of the first rotary member such that the first rotary member is interposed between the second rotary member and the nip forming member, and thus form the nip portion between the first rotary member and the second rotary member, a heating element configured to heat the nip portion, a temperature detection element configured to detect a temperature of the nip forming member, a holder configured to hold the temperature detection element, and an urging member configured to urge the holder toward the nip forming member to bring the holder into contact with the nip forming member, wherein the holder includes a base member configured to receive an urging force from the urging member, and a head member to which the temperature detection element is attached, the head member being configured to be in contact with the base member and tiltable with respect to the base member with a contact portion between the head member and the base member as a fulcrum, and wherein the head member is configured to be urged toward the nip forming member by the urging force and to tilt following a portion of the nip forming member opposing the head member.

According to another aspect of the invention, a temperature detection apparatus includes a temperature detection element configured to oppose a measurement target in a predetermined direction and detect a temperature of the measurement target, and a holder configured to hold the temperature detection element, wherein the holder includes a base member, and a head member to which the temperature detection element is attached, the head member being configured to be in contact with the base member and tiltable with respect to the base member with a contact portion between the head member and the base member as a fulcrum, and wherein the head member is configured to tilt to follow a portion of the measurement target opposing the head member in a case of being urged toward the measurement target by an urging force received via the base member.

Further features of the present invention will become apparent from the following description of exemplary embodiments with reference to the attached drawings.

BRIEF DESCRIPTION OF THE DRAWINGS

FIGS. 3A and 3B are each a diagram illustrating the positional relationship between a detection element and a measurement target according to the first embodiment.

FIG. 5A is a plan view of a temperature detection apparatus according to a second embodiment.

FIGS. 5B and 5C are each a section view of the temperature detection apparatus according to the second embodiment.

FIG. 11A is a plan view of a temperature detection apparatus according to a comparative example.

FIG. 11B is a section view of the temperature detection apparatus according to the comparative example.

DESCRIPTION OF THE EMBODIMENTS

Embodiments of the present disclosure will be described below with reference to drawings.

Image Forming Apparatus

Figure 9:
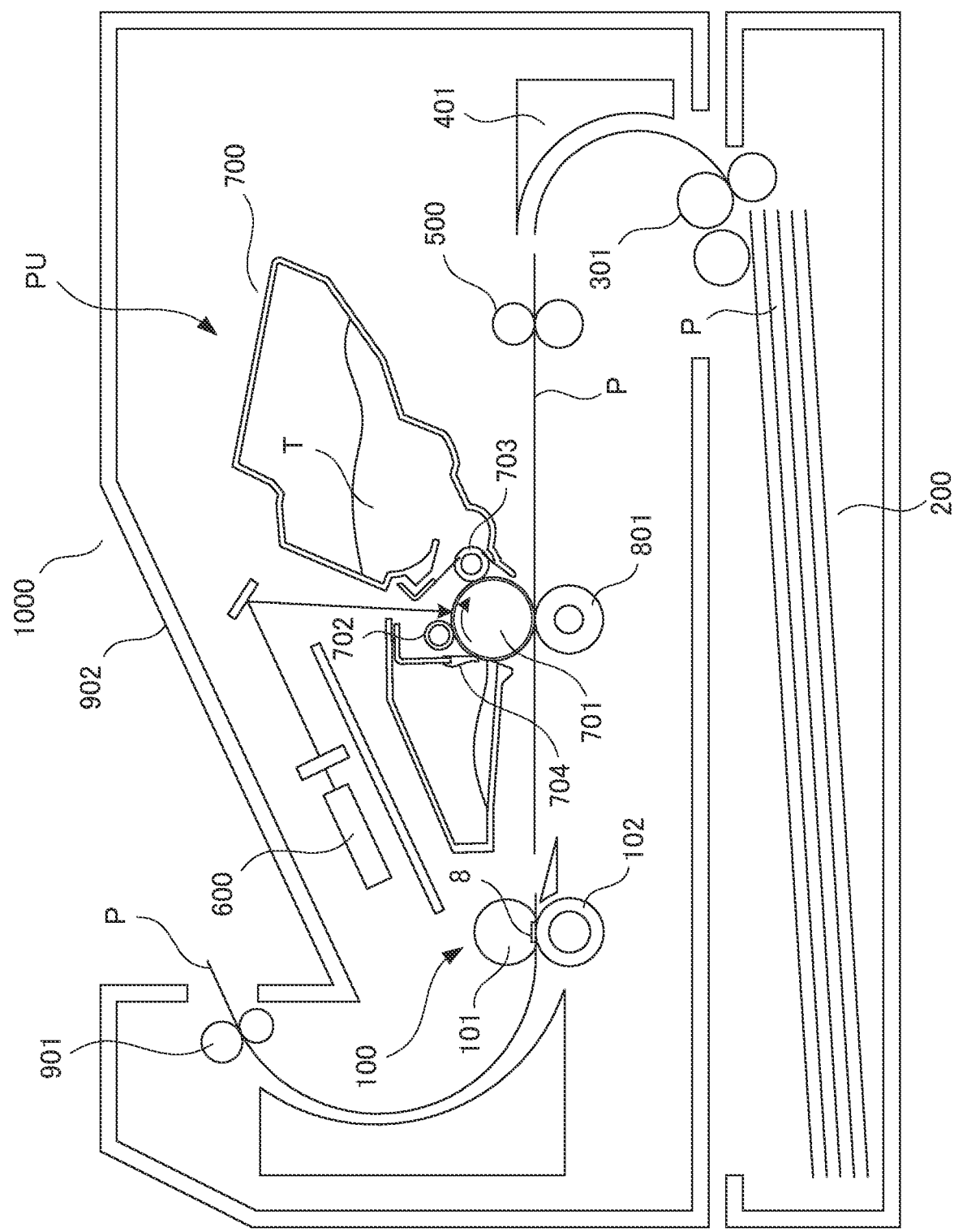
FIG. 9 is a schematic view of an image forming apparatus according to an embodiment.

FIG. 9 illustrates an example of an image forming apparatus 1000 according to one embodiment. The image forming apparatus 1000 is a monofunctional printer of an electrophotographic system that forms an image on a sheet P on the basis of image information transmitted from an external device. To be noted, the "image forming apparatus" is not limited to a monofunctional printer, and may be, for example, a copier or a multifunctional apparatus. In addition, as the sheet P that is a recording material, various sheet materials of different sizes and materials can be used. Examples of the various sheet materials include paper sheets such as plain paper sheets and cardboards, plastic films, cloths, surface-treated sheet materials such as coated paper sheets, and sheet materials of irregular shapes such as envelopes and index paper sheets.

The image forming apparatus 1000 includes a process unit PU serving as an image forming means or image forming portion, a fixing apparatus 100, and a conveyance mechanism that feeds and conveys sheets P one by one. The process unit PU includes a photosensitive drum 701 serving as an image bearing member, a charging roller 702 serving as a charging means or charging unit, a scanner unit 600 serving as an exposing means or exposing unit, and a developing unit 700 serving as a developing means or developing apparatus. In addition, the process unit PU includes a transfer roller 801 serving as a transfer means or transfer unit, and a drum cleaner 704 serving as a cleaning means or cleaning unit.

The photosensitive drum 701 is an electrophotographic photosensitive member formed in a drum shape (cylindrical shape). The developing unit 700 includes a container accommodating toner T serving as a developer, and a developing roller 703 that bears the toner T and supplies the toner T to the photosensitive drum 701. The photosensitive drum 701, the charging roller 702, the developing unit 700, and the drum cleaner 704 are part of a process cartridge integrally attachable to and detachable from an image forming apparatus body.

When an instruction (printing command) to execute an image forming operation is transmitted to the image forming apparatus 1000, a series of image forming operation that will be described below is started. First, a feeding roller 301 rotates, and the uppermost sheets of the sheets P stacked in a feeding tray 200 are fed one by one, and the fed sheet P is conveyed to a conveyance roller pair 500 while being guided by a conveyance guide 401.

In parallel with the conveyance of the sheet P, in the process unit PU, a toner image based on the image information received from the external device is formed by an electrophotographic process. That is, the photosensitive drum 701 is rotationally driven, and the charging roller 702 uniformly charges the surface of the photosensitive drum 701. The scanner unit 600 exposes the photosensitive drum 701 by irradiating the photosensitive drum 701 with laser light modulated on the basis of the image information, and thus draws an electrostatic latent image on the surface of the photosensitive drum 701. The developing roller 703 develops (visualizes) the electrostatic latent image as a toner image by using a developer including toner.

The conveyance roller pair 500 delivers the sheet P into a transfer portion between the photosensitive drum 701 and the transfer roller 801 at a timing matching the timing in which the toner image formed on the photosensitive drum 701 reaches the transfer portion. In the transfer portion, a predetermined voltage is applied to the transfer roller 801, and thus the toner image is transferred from the photosensitive drum 701 onto the sheet P. Attached matter such as transfer residual toner still remaining on the surface of the photosensitive drum 701 even after passing through the transfer portion is removed by the drum cleaner 704.

The sheet P having passed through the transfer portion is conveyed to the fixing apparatus 100. The fixing apparatus 100 is a fixing apparatus of a thermal fixation system including a fixing member (first rotary member), a pressurizing member (second rotary member) that forms a nip portion between the fixing member and the pressurizing member, and a heating means or heating mechanism that heats the image on the recording material. The configuration of the fixing apparatus 100 will be described later. The sheet P having passed through the fixing apparatus 100 is discharged to the outside of the image forming apparatus body by a discharge roller pair 901, and is supported on a discharge tray 902.

Fixing Apparatus

Figure 10:
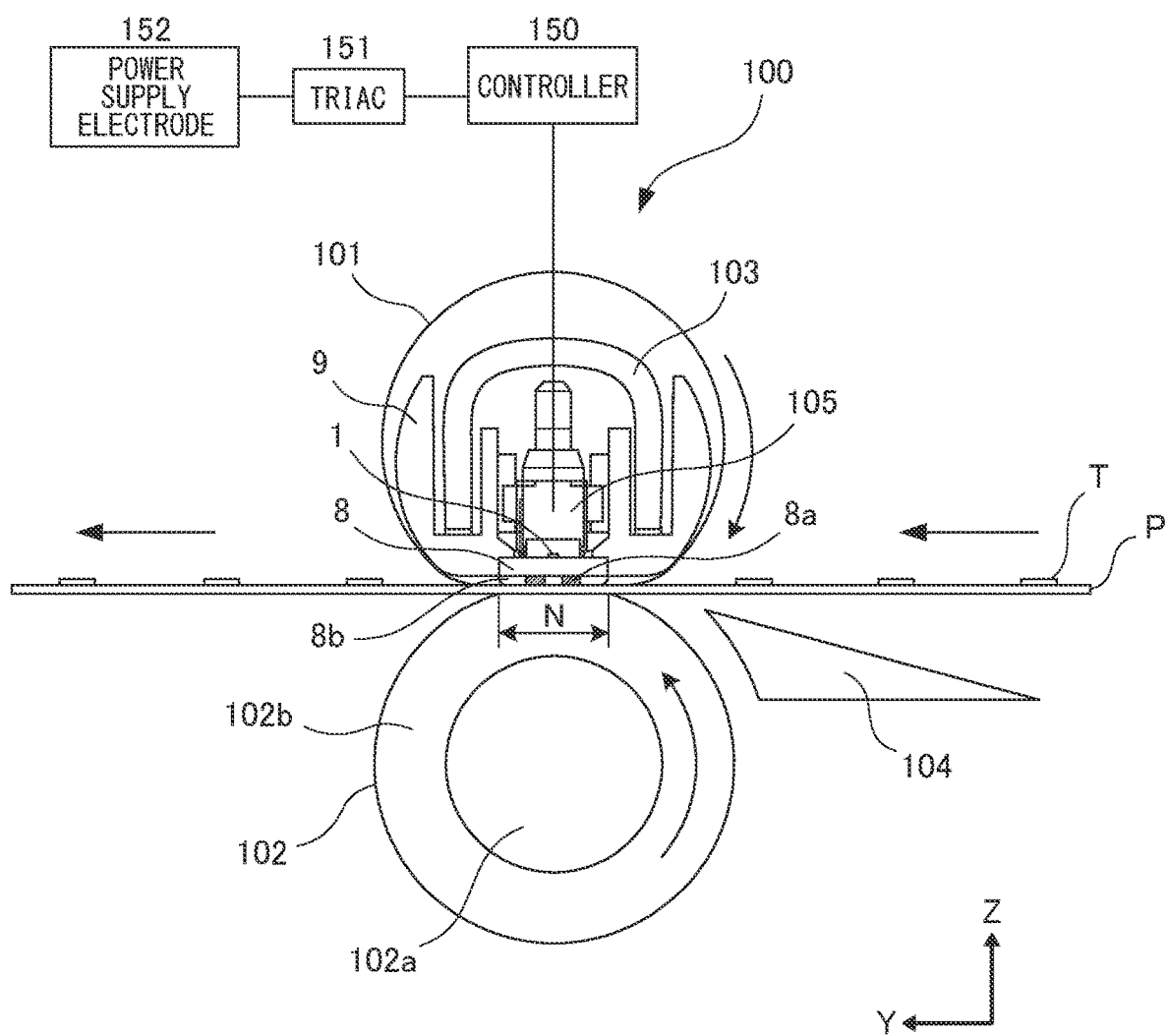
FIG. 10 is a schematic view of a fixing apparatus according to an embodiment.

A configuration example of the fixing apparatus 100 will be described with reference to FIG. 10. FIG. 10 illustrates a cross-section of the fixing apparatus 100 taken along a virtual plane orthogonal to the longitudinal direction of the nip portion N (a direction orthogonal to the recording material conveyance direction in the nip portion N, that is, a main scanning direction in the image formation).

The fixing apparatus 100 includes a film 101, a pressurizing roller 102, a heater 8, a heater holder 9, and a stay 103.

The heater 8 includes a heater board in which a pattern of a heat-generating resistor 8a or heating element is formed on a ceramic substrate having a plate shape elongated in a longitudinal direction of the heater 8. A glass layer 8b serving as a protective layer (insulating layer) covering the heat-generating resistor 8a coats the front surface of the heater 8. The detection element 1 of a temperature detection apparatus 105 that will be described later is adjacent to the back surface of the heater 8.

The heat-generating resistor 8a generates heat by receiving power supply (electrification) via a power supply electrode 152 from an unillustrated power source circuit. The controller 150 serving as a control means or controller provided in the image forming apparatus controls ON/OFF of a triac 151 on the basis of a temperature detection signal of the temperature detection apparatus 105, and controls the amount of power supply to the heater 8 such that the heater 8 reaches a predetermined target temperature. As a result of this, the surface temperature of the film 101 is maintained at a predetermined fixing temperature suitable for fixation of an image. The controller 150 includes one or more processors including a central processing unit: CPU, and a memory that provides a storage region, and controls each part of the image forming apparatus by the CPU loading a program from the memory and executing the program.

The film 101 is an example of a first rotary member. The film 101 is, for example, a tubular heat-resistant film having a three-layer structure. The innermost layer of the film 101 is a base layer, which is a layer responsible for mechanical properties such as torsional strength, smoothness, and the like of the film 101. The base layer is, for example, formed from resin such as polyimide, polyamideimide, PEEK, PES, or PPS. Here, PEEK stands for polyetheretherketone, PES stands for polyethersulfone, and PPS stands for polyphenylene sulfide. A conductive primer layer is a next layer to the base layer. The conductive primer layer is a conductive layer in which a conductive particle such as carbon black is dispersed, and plays a role of an adhesive bonding a third layer and the base layer to each other. The outermost layer is a top layer. The top layer is designed to have appropriate resistance and film thickness so as not to cause various image defects.

The heater holder 9 is a holding means or holding member that holds the heater 8. The heater holder 9 is formed from a heat-resistant resin such as PPS or liquid crystal polymer. In addition, the heater holder 9 also serves as a guide member that prompts smooth rotation of the film 101.

The heater 8 and the heater holder 9 are disposed in an inner space of the film 101. The heater 8 and the heater holder 9 constitute a nip forming member or nip forming unit that forms the nip portion N together with the pressurizing roller 102. To be noted, instead of a configuration in which the heater 8 slides on the inner surface of the film 101, a sliding member having a sheet shape or plate shape that slides on the inner surface of the film 101 may be disposed between the heater 8 and the film 101. In this case, the sliding member is also a part of the nip forming member or nip forming unit. The material of the sliding member is preferably a material having high thermal conductivity and having high slidability on the inner surface of the film 101, such as aluminum.

The stay 103 is formed from, for example, metal such as iron or aluminum. The stay 103 is a high-rigidity member that suppresses creep deformation of the heater holder 9. That is, the stay 103 has a function of improving the rigidity of a support structure that supports the heater 8. In addition, as a result of the stay 103 being urged downward in the drawing by an unillustrated urging member (spring member), a predetermined pressurizing force is generated in the nip portion N.

The pressurizing roller 102 is an example of a second rotary member. The pressurizing roller 102 is, for example, an elastic roller in which a core metal 102a formed from iron, aluminum, or the like is covered with a heat-resistant elastic member 102b such as silicone rubber. The surface layer of the pressurizing roller 102 is a coating film formed from a fluorine resin such as PFA, PTFE, or FEP that has a good releasability for toner. Here, PFA stands for tetrafluoroethylene-perfluoroalkyl vinyl ether copolymer, PTFE stands for polytetrafluoroethylene, and FEP stands for perfluoroethylene propene copolymer.

The pressurizing roller 102 is in contact with the outer surface (outer circumferential surface) of the film 101. The pressurizing roller 102 is in pressure contact with the nip forming member (heater 8 and heater holder 9) with the film 101 therebetween, and forms a nip portion N (fixing nip) as a pressure contact portion therebetween. In other words, the second rotary member (pressurizing roller 102) nips the first rotary member (film 101) together with the nip forming member (heater 8 and heater holder 9), and forms the nip portion N (fixing nip) between the first rotary member and the second rotary member. The pressurizing roller 102 is rotationally driven by a motor serving as a drive source provided in the image forming apparatus body. The film 101 is rotated to follow the pressurizing roller 102 by a frictional force received from the pressurizing roller 102 in the nip portion N.

The sheet P onto which an image has been transferred in the transfer portion is conveyed to the nip portion N of the fixing apparatus 100 by being guided by the guide 104. The fixing apparatus 100 nips and conveys the sheet P in the nip portion N between the film 101 and the pressurizing roller 102, and the film 101 heated by heat conduction from the heater 8 heats the image on the sheet P. As a result of this, toner T in the image is softened by being heated and pressurized, thus the toner T adheres to the sheet P, and the image is fixed to the sheet P.

Temperature Detection Apparatus: Comparative Example

Figure 12:
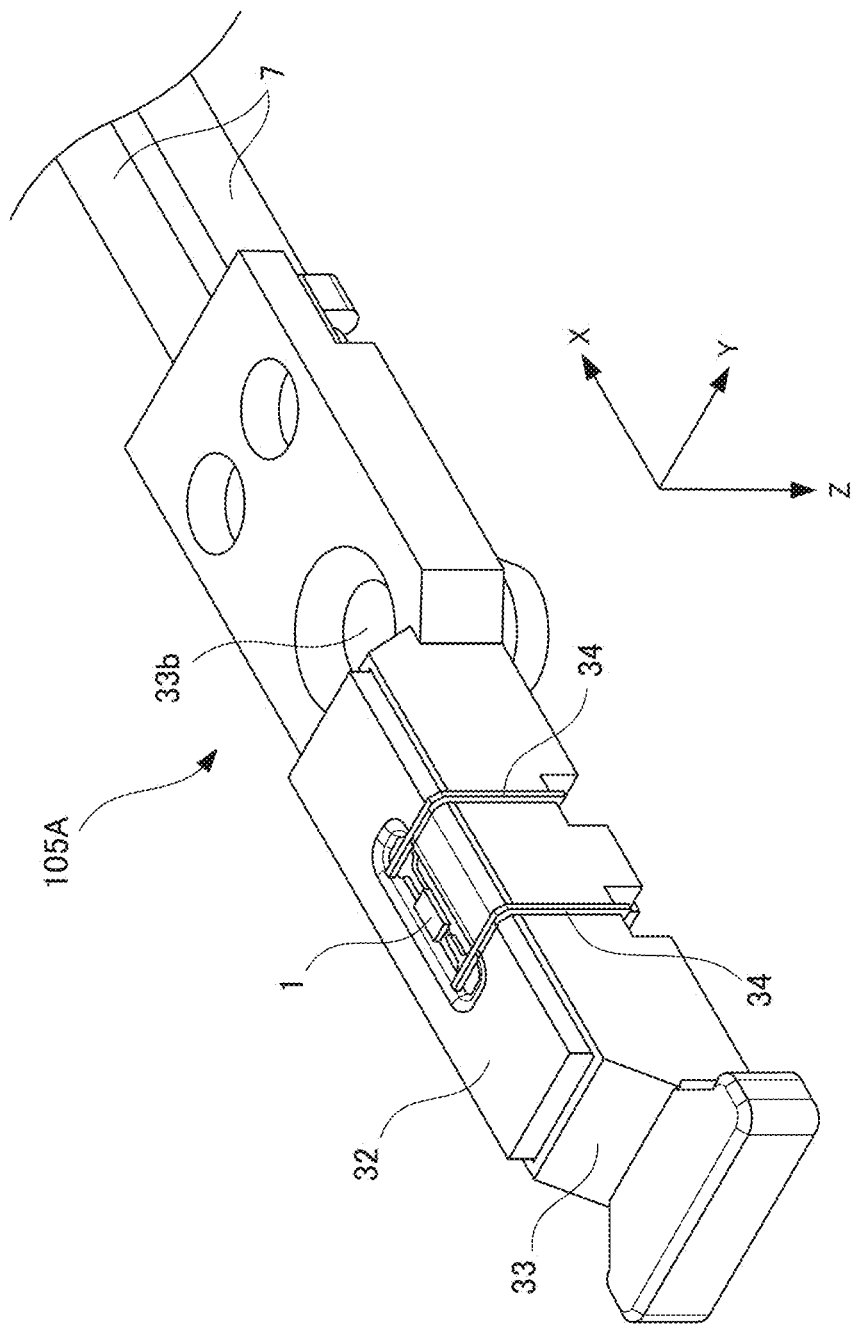
FIG. 12 is a perspective view of the temperature detection apparatus according to the comparative example.

An overview of the temperature detection apparatus will be described by using a temperature detection apparatus according to a comparative example. FIG. 11A is a plan view of a temperature detection apparatus 105A according to the comparative example. FIG. 11B is a section view of the temperature detection apparatus 105A illustrating a cross-section taken along a line A-A of FIG. 11A. FIG. 12 is a perspective view of the temperature detection apparatus 105A.

In the description and drawings below, the longitudinal direction of the heater 8 in a surface on which the heat-generating resistor 8a of the heater 8 is disposed will be referred to as an X direction. The short direction of the heater 8, that is, a direction orthogonal to the longitudinal direction in the surface on which the heat-generating resistor 8a of the heater 8 is disposed, will be referred to as a Y direction. A direction orthogonal to both the X direction and the Y direction will be referred to as a Z direction. The X direction can be referred to as the longitudinal direction of the nip portion N of the fixing apparatus 100, the Y direction can be referred to as the recording material conveyance direction in the nip portion N, and the Z direction can be referred to as the thickness direction of the sheet P passing through the nip portion N. In addition, the X direction can be referred to as the generatrix direction of the film 101.

The Z direction is a direction (first direction) in which the detection element 1 that will be described later opposes the heater 8 serving as a measurement target. The X direction is an example of a second direction intersecting with the first direction. The Y direction is an example of a third direction intersecting with both the first direction and the second direction. The first direction, the second direction, and the third direction are preferably orthogonal to each other.

In addition, if necessary, for each of the X, Y, and Z directions, the side indicated by an arrow in the illustration is denoted with a prefix of "+", and the side opposite to the side indicated by the arrow in the illustration is denoted with a prefix of "−". For example, the +Y side has the same meaning as the downstream side in the recording material conveyance direction in the nip portion N. The −Y side has the same meaning as the upstream side in the recording material conveyance direction in the nip portion N. In addition, the +Z side is the side on which the film 101 is disposed with respect to the pressurizing roller 102 in the Z direction, and the −Z side is the side on which the pressurizing roller 102 is disposed with respect to the film 101 in the Z direction.

As illustrated in FIGS. 11A, 11B, and 12, the temperature detection apparatus 105A includes a detection element 1, a detection element holder 33, a heat-resistant elastic member 32, an urging member 5, a heat-resistant coating 6, and harnesses 7.

The detection element 1 is an element for converting the temperature of the measurement target (measured object, heater 8 herein) into an electric signal. The controller 150 can detect the temperature of the heater 8 on the basis of the resistance determined by the value of the voltage applied to a thin-film thermistor and the value of the current in the thin-film thermistor. That is, the detection element 1 is configured to detect the temperature of the nip forming member.

The detection element holder 33 is a support member (detection element holding member) that supports the detection element 1. The detection element holder 33 has a holding surface 33a that holds the heat-resistant elastic member 32. The holding surface 33a is provided on the surface of the detection element holder 33 on the heater 8 side (−Z side).

The heat-resistant elastic member 32 is an elastic member (pad) having a plate shape extending in the X direction and the Y direction in an approximate rectangular shape with the Z direction as the thickness direction. The detection element 1 is attached to an attachment portion provided on the surface of the heat-resistant elastic member 32 on the heater 8 side (−Z side).

Two stainless steel plates 32a and 32b that are electrically insulated from each other are integrally formed at an end portion of the detection element holder 33 in the +X direction. The stainless steel plates 32a and 32b are respectively electrically connected to terminals of the detection element 1 via two dumet wires 34 illustrated in FIG. 12. In addition, two harnesses 7 (electric wires) extend from the stainless steel plates 32a and 32b in the +X direction, and thus the stainless steel plates 32a and 32b are connected to an electric circuit of the image forming apparatus body. As a result of this, the temperature detection apparatus 105A is electrically connected to the controller 150.

In addition, the detection element holder 33 has a positioning hole 33b and two positioning protrusions 33c. The positioning hole 33b is an opening portion that fits with a positioning protrusion 9a provided on the heater holder 9. The positioning protrusions 33c are parts that respectively engage with two positioning walls 9b provided in the heater holder 9. As a result of the positioning protrusion 9a fitting in the positioning hole 33b, the position of the detection element holder 33 in the X direction and Y direction with respect to the heater holder 9 is determined on the basis of the axis of the positioning protrusion 9a. In addition, as a result of the positioning protrusions 33c engaging with the positioning walls 9b, rotation of the detection element holder 33 about the positioning protrusion 9a is restricted.

A hole portion 9c (window portion) penetrating the heater holder 9 in the Z direction is provided in the heater holder 9. In a state in which the detection element holder 33 is positioned with respect to the heater holder 9, the detection element 1 is exposed to the inside of the hole portion 9c as viewed from the heater 8 side (−Z side).

The urging member 5 abuts a surface of the detection element holder 33 on the +Z side, and urges the detection element holder 33 toward the heater 8 in the Z direction, that is, to the −Z side. The urging member 5 has holes that fit with protrusions serving as spring attachment portions 9d provided on the heater holder 9, and is fixed to the heater holder 9 via a fixing tool 9e. The urging member 5 is a plate spring abutting the detection element holder 33 at a distal end portion extending in the −X direction from the spring attachment portions 9d. As a result of the urging force of the urging member 5, the detection element 1 comes into contact with the heater 8 on the inside of the hole portion 9c. That is, the urging member 5 urges the holder toward the nip forming member so as to bring the holder (detection element holder 33) into contact with the nip forming member (heater holder 9 and heater 8). In addition, the heat-resistant elastic member 32 elastically deforms in a space between the holding surface 33a of the detection element holder 33 and a back surface of the heater 8 (surface of the board on the +Z side), and thus the detection element 1 is pressed against the heater 8.

The heat-resistant coating 6 is disposed to secure withstand voltage and protect the detection element 1. The heat-resistant coating 6 covers approximately the entirety of the heat-resistant elastic member 32 and the detection element holder 33 that support the detection element 1. That is, the heat-resistant coating 6 protects the detection element 1, the stainless steel plates 32a and 32b, and the conductive wire portion of the harnesses 7. To be noted, in the perspective view of FIG. 12, the heat-resistant coating 6 is omitted.

As described above, to precisely measure the temperature of the measurement target by the detection element 1, it is desired that the positional precision of the detection element 1 with respect to the measurement target is improved. In the present comparative example, the detection element 1 can be stably caused to abut the heater 8 by the heat-resistant elastic member 32 capable of elastic deformation, but the material of the heat-resistant elastic member 32 is limited, which leads to increase in the cost. To be noted, examples of the material of the heat-resistant elastic member 32 include silicone rubber, fluorine rubber, ceramic paper having a cushioning property, and glass wool.

First Embodiment

A temperature detection apparatus according to a first embodiment will be described below. The temperature detection apparatus according to the present embodiment can be used for detecting the temperature of the heater 8 in the image forming apparatus 1000 described with reference to FIGS. 9 and 10 similarly to the temperature detection apparatus according to the comparative example. In the description below, elements having substantially the same configurations and functions as in the comparative example will be denoted by the same reference signs and description thereof will be omitted.

Figure 1A:
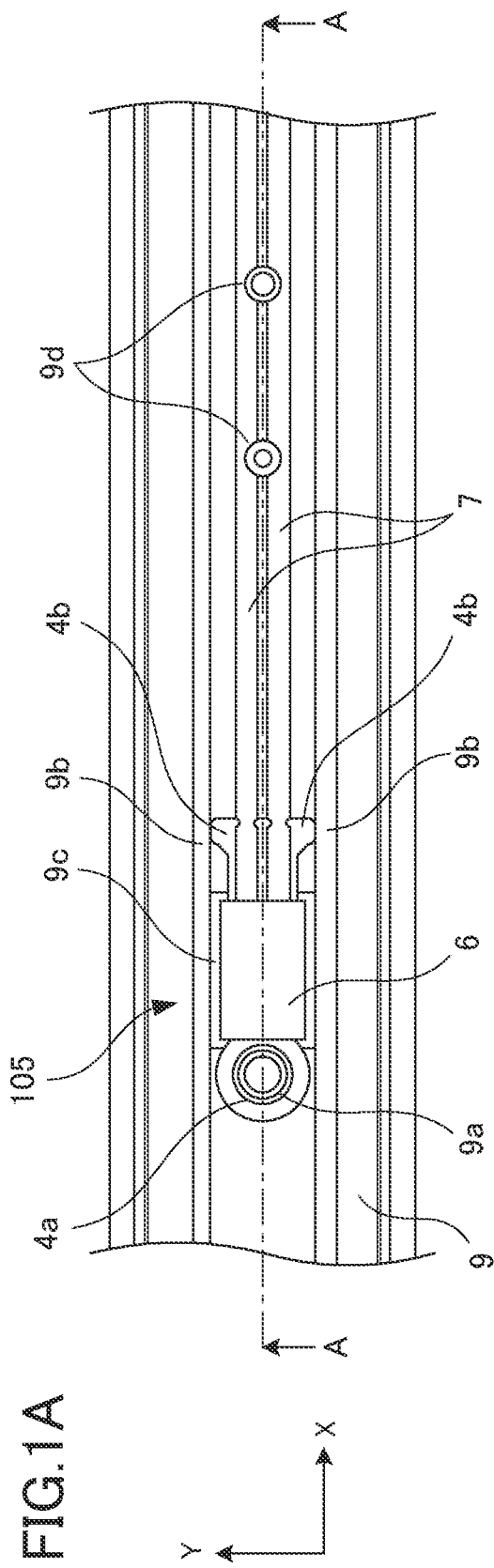
FIG. 1A is a plan view of a temperature detection apparatus according to a first embodiment.
Figure 1B:
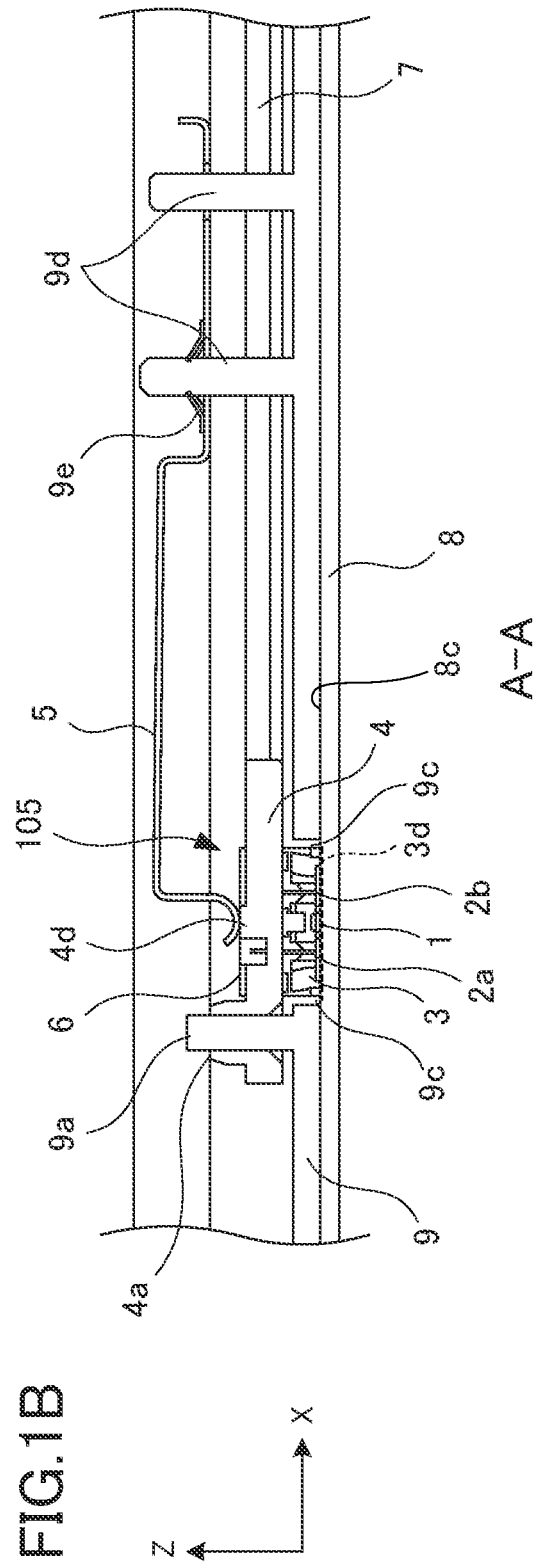
FIG. 1B is a section view of the temperature detection apparatus according to the first embodiment.
Figure 2:
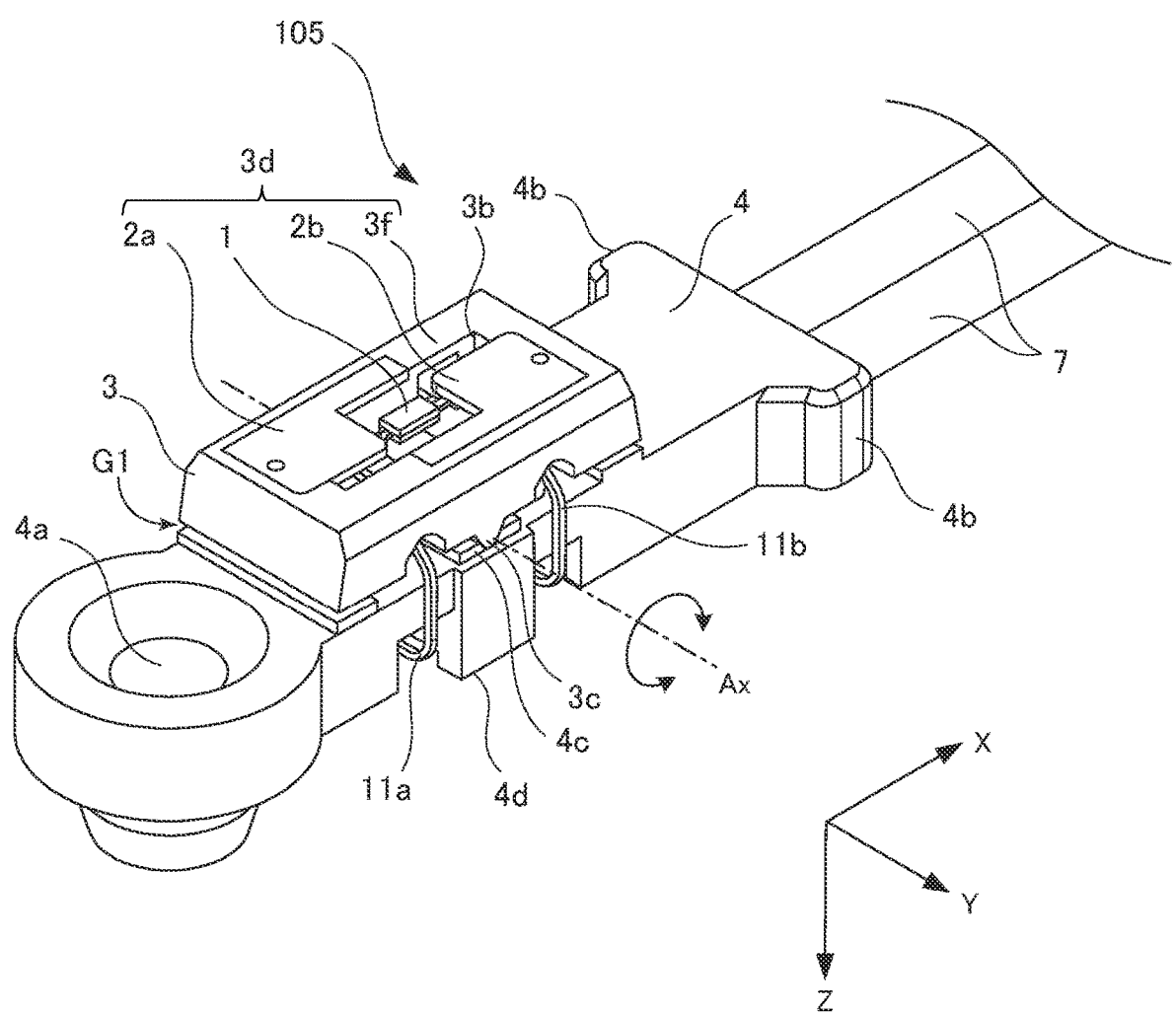
FIG. 2 is a perspective view of the temperature detection apparatus according to the first embodiment.

FIG. 1A is a plan view of the temperature detection apparatus 105 according to the first embodiment. FIG. 1B is a section view of the temperature detection apparatus 105 illustrating a cross-section taken along a plane indicated by a line A-A of FIG. 1A. FIG. 2 is a perspective view of the temperature detection apparatus 105.

As illustrated in FIGS. 1A, 1B, and 2, the temperature detection apparatus 105 includes a detection element 1, a head member 3, a base member 4, an urging member 5, a heat-resistant coating 6, and harnesses 7.

The detection element 1 is an element for converting the temperature of the measurement target (measured object, heater 8 herein) into an electric signal. The detection element 1 is disposed to oppose a surface 8c (second surface) on the +Z side of the heater 8 in the Z direction. The surface 8c on the +Z side of the heater 8 is a surface of the heater 8 on the opposite side to the fixing nip.

As the detection element 1, for example, a thermistor, a temperature measurement resistor, a thermocouple, a thermopile, or the like can be used in accordance with the range of temperature measurement, the purpose of the temperature detection (for temperature control or for abnormality detection), or the like. In the present embodiment, a thin-film thermistor is used as the detection element 1. The resistance of the thin-film thermistor changes in accordance with the temperature of the heater 8.

The head member 3 is an example of a first holding member (detection element holding member) that holds the detection element 1. The head member 3 has a heat sensing surface 3*d* (first surface or opposing surface) opposing the surface 8*c* (second surface) of the heater 8 in the Z direction (first direction). The heat sensing surface 3*d* of the present embodiment includes surfaces 2*f* of metal plates 2*a* and 2*b* described below, which are attached to a resin part constituting the body portion of the head member 3 as illustrated in FIG. 3, an end surface 3*f* of the head member 3, and the detection element 1 (surface whose height is adjusted with an adhesive 10 that will be described later).

The head member 3 of the present embodiment is a member having an approximate polygonal tube shape opening in the Z direction. The detection element 1 is disposed inside the opening portion 3*b* of the head member 3 and at an end portion position of the head member 3 on the heater 8 side (−Z side). On the head member 3, the two metal plates 2*a* and 2*b* are disposed to be exposed to the heater 8 side (−Z side). The detection element 1 is fixed to an end portion of the two metal plates 2*a* and 2*b* projecting to the inside of the opening portion 3*b* by resistance welding or laser welding. One terminal of the detection element 1 is supported by the first metal plate 2*a*, and the other terminal of the detection element 1 is supported by the second metal plate 2*b*.

The head member 3 includes a supported portion 3*c* supported by the base member 4. The supported portion 3*c* in the present embodiment is a projection portion having a semi-columnar shape (semi-cylindrical shape) extending in the Y direction. The supported portion 3*c* is formed in a semi-circle shape projecting to the opposite side (+Z side) to the heater 8 in the Z direction as viewed in the Y direction. In addition, the supported portion 3*c* is disposed at each end portion of the head member 3 in the Y direction.

The base member 4 is an example of a second holding member that holds the head member 3. The head member 3 includes a support portion 4*c* that tiltably supports the head member 3, and a positioning hole 4*a* serving as a positioning portion that positions the head member 3.

The support portion 4*c* is provided on the side of the base member 4 opposing the head member 3 (−Z side). The support portion 4*c* in the present embodiment is a recess portion (groove portion) having a semi-cylindrical surface shape extending in the Y direction. As a result of the supported portion 3*c* of the head member 3 engaging with (abutting) the support portion 4*c*, the head member 3 is tiltably (swingably or pivotably) supported by the base member 4. In a portion other than a contact portion where the support portion 4*c* and the supported portion 3*c* abut each other, a gap G1 in the Z direction is present between the base member 4 and the head member 3 as illustrated in FIG. 2.

The supported portion 3*c* of the head member 3 and the support portion 4*c* of the base member 4 are engaged with each other at at least two positions at respective end portions of the head member 3 in the Y direction. As a result of this, the head member 3 tilts about the axis Ax of the Y direction with respect to the base member 4 with the support portion 4*c* as a fulcrum. That is, the head member 3 is allowed to tilt with respect to the base member 4 by using the contact portion (supported portion 3*c* and support portion 4*c*) between the head member 3 and the base member 4 as a fulcrum. To be noted, as long as the head member 3 is configured to tilt about the axis Ax of the Y direction, for example, the support portion 4*c* and the supported portion 3*c* may be formed in the entire length of the head member 3 in the Y direction such that the support portion 4*c* and the supported portion 3*c* engage with each other in the entire length of the head member 3 in the Y direction.

As described above, the head member 3 is configured to be capable of tilting about the axis Ax of a third direction intersecting with the Z direction (first direction) with respect to the base member 4. The axis Ax of the third direction is preferably an axis extending in a direction orthogonal to the first direction in which the detection element 1 opposes the heater 8. The axis Ax about which the head member 3 tilts in the present embodiment is an axis extending in the Y direction orthogonal to the Z direction.

The support portion 4*c* of the base member 4 and the supported portion 3*c* of the head member 3 are preferably positioned right under (on the +Z side of) the detection element 1 in the Z direction in which the detection element 1 opposes the heater 8. In other words, as viewed in the direction of the axis Ax (Y direction), the contact portion between the support portion 4*c* and the supported portion 3*c* is positioned on the +Z side with respect to the detection element 1, and the position of the contact portion in the X direction overlaps with the position of the detection element 1 in the X direction. Further, in other words, as viewed in the Z direction, the detection element 1 and the axis Ax about which the head member 3 tilts are in a positional relationship in which these two overlap with each other. Here, two elements overlapping with each other as viewed in the predetermined direction refers to a situation in which in a case where each element is orthogonally projected onto a virtual plane orthogonal to the predetermined direction, the projection region of one element and the projection region of the other element overlap with each other at least partially.

The positioning hole 4*a* of the base member 4 is an opening portion that fits with the positioning protrusion 9*a* provided on the heater holder 9. In the illustrated example, the positioning protrusion 9*a* is a projection portion having an approximate columnar shape (shaft shape) extending in the Z direction, and the positioning hole 4*a* is a cylindrical hole formed to penetrate the base member 4 in the Z direction.

The head member 3 and the base member 4 are each formed from a resin material (for example, liquid crystal polymer: LCP) having sufficient heat resistance for the heat from the heater 8. The material of the head member 3 and the material of the base member 4 may be different.

Two electrically insulated harnesses 7 are held by the base member 4. Conductive wires are exposed at end portions of the harnesses 7 on the −X side. The exposed conductive wires are respectively connected to the metal plates 2*a* and 2*b* of the head member 3 via dumet wires 11*a* and 11*b* illustrated in FIG. 2. The harnesses 7 extend to the +X side from a connecting portion with the dumet wires 11*a* and 11*b*, and are connected to an electric circuit of the image forming apparatus body.

As described above, in the present embodiment, the head member 3 and the base member 4 are formed as separate members, and are electrically connected to each other via dumet wires having flexibility (elasticity). As a result of this, the possibility of an excessive force acting on the head member 3 when installing the harnesses 7 can be reduced. That is, even if a force is applied to the temperature detection apparatus 105 when installing the harnesses 7, the force is received by the engagement between the positioning hole 4a of the base member 4 and the positioning protrusion 9a of the heater holder 9, and therefore the force is not likely to act on the head member 3.

The urging member 5 abuts an abutment portion 4d provided on an end surface of the base member 4 on the +Z side, and urges the base member 4 on the heater 8 side (−Z side) in the Z direction. The head member 3 receives the urging force of the urging member 5 via the contact portion between the supported portion 3c and the support portion 4c. As a result of this, the detection element 1 is urged toward the heater 8 side (−Z side) in the Z direction.

The urging member 5 has holes that fit with the protrusions serving as the spring attachment portions 9d provided on the heater holder 9, and is fixed to the heater holder 9 via the fixing tool 9e. The urging member 5 is a plate spring that presses the abutment portion 4d of the base member 4 at a distal end portion extending to the −X side from the spring attachment portions 9d. That is, the base member 4 receives the urging force from the urging member 5. To be noted, in FIG. 1A, the urging member 5 is omitted. The urging member 5 is an example of an urging member (positioning means) for positioning the detection element 1 with respect to the heater 8 (measurement target) in the Z direction (first direction).

The heat-resistant coating 6 is provided for securing withstand voltage and protecting the detection element 1. The material of the heat-resistant coating 6 is, for example, a polyimide film. The heat-resistant coating 6 covers the lower surface of the metal plates 2a and 2b supporting the detection element 1 and approximately the entirety of the head member 3 and the base member 4. That is, the heat-resistant coating 6 protects the detection element 1, the metal plates 2a and 2b, and the conductive wire portion of the harnesses 7. In addition, the heat-resistant coating 6 is omitted in the perspective view of FIG. 2. In addition, even if approximately the entirety of the head member 3 and the base member 4 is covered by the heat-resistant coating 6, the head member 3 is allowed to tilt with respect to the base member 4 due to the margin of the inner peripheral length of the heat-resistant coating 6.

In the case of coupling the temperature detection apparatus 105 to the fixing apparatus 100 by holding the temperature detection apparatus 105 by the heater holder 9 serving as a holding means, the positioning hole 4a of the base member 4 is fitted with the positioning protrusion 9a of the heater holder 9. As a result of this, the position of the base member 4 in the X direction (second direction) and the Y direction (third direction) with respect to the heater holder 9 is determined on the basis of the axis of the positioning protrusion 9a. That is, the base member 4 is positioned in a direction intersecting with the Z direction (first direction) with respect to the heater holder 9 holding the temperature detection apparatus 105. In addition, as a result of the positioning protrusions 4b of the base member 4 engaging with the positioning walls 9b of the heater holder 9, rotation of the base member 4 about the positioning protrusion 9a is restricted.

In a state in which the temperature detection apparatus 105 is positioned in the X direction and the Y direction, the detection element 1 is exposed to the inside of the hole portion 9c of the heater holder 9 as viewed from the heater 8 side (−Z side) in the Z direction. Further, as a result of the head member 3 being urged toward the heater 8 side (−Z side) in the Z direction by the urging force of the urging member 5, the detection element 1 is positioned with respect to the heater 8 in the Z direction. Meanwhile, as a result of the positioning hole 4a sliding in the Z direction on the positioning protrusion 9a, the base member 4 can move (displace) in the Z direction (first direction) with respect to the heater holder 9.

To be noted, instead of the configuration of the present embodiment, a configuration in which a positioning protrusion (projection portion) extending in the Z direction is disposed on the base member 4 as a positioning portion and a positioning hole serving as an opening portion is disposed in the holding means (heater holder 9) may be employed. In addition, the opening portion can be formed in a hole shape (recess shape) not penetrating the base member 4 or the heater holder 9.

FIGS. 3A and 3B illustrate the surroundings of the detection element 1 according to the first embodiment. FIG. 3A corresponds to a state before the temperature detection apparatus 105 is coupled to the fixing apparatus, and FIG. 3B corresponds to a state after the coupling.

As illustrated in FIG. 3A, two terminals 1a of the detection element 1 are attached to back surfaces 2r on the opposite side to the surfaces 2f of the metal plates 2a and 2b, respectively (+Z side, opposite side to the measurement target). The surfaces 2f on the −Z side (measurement target side) of the metal plates 2a and 2b are substantially flush with the end surface 3f of the body portion of the head member 3. The surfaces 2f of the metal plates 2a and 2b are part of the heat sensing surface 3d of the temperature detection apparatus 105 opposing the heater 8 serving as a measurement target. That is, in the surroundings of the detection element 1, the surface of the temperature detection apparatus 105 on the +Z side (measurement target side) is formed to be flush with the surfaces 2f of the metal plates 2a and 2b.

The detection element 1 is retracted to the +Z side by a predetermined height h1 with respect to the surfaces 2f of the metal plates 2a and 2b. In addition, a gap between the detection element 1 and the heat-resistant coating 6 is filled with a thermally-conductive adhesive 10, and thus the height difference of h1 is filled in. To be noted, the amount of retraction (height h1) of the detection element 1 with respect to the heat sensing surface 3d is set such that the detection element 1 does not project to the −Z side with respect to the heat sensing surface 3d even in consideration of the dimensional tolerance or the like of the parts. In addition, the end surface 3f of the head member 3 on the −Z side can be also configured to be flush with the surfaces 2f of the metal plates 2a and 2b. To be noted, the surface of the detection element 1 can be also configured to come into direct contact with the heater 8, that is, the surface of the detection element 1 can be configured as a heat sensing surface.

As illustrated in FIG. 3B, when the temperature detection apparatus 105 is coupled to the fixing apparatus 100, the head member 3 is urged toward the heater 8 side (−Z side) in the Z direction by the urging force of the urging member 5, and is thus pressed against the heater 8 serving as a measurement target. At this time, the detection element 1 abuts (is adjacent to) the heater 8 with the adhesive 10 and the heat-resistant coating 6 therebetween. That is, the detection element 1 is positioned at a position away from the heater 8 by an amount corresponding to the height h1 of the adhesive 10 and the thickness of the heat-resistant coating 6 in the Z direction.

Merit of First Embodiment

Figure 4A:
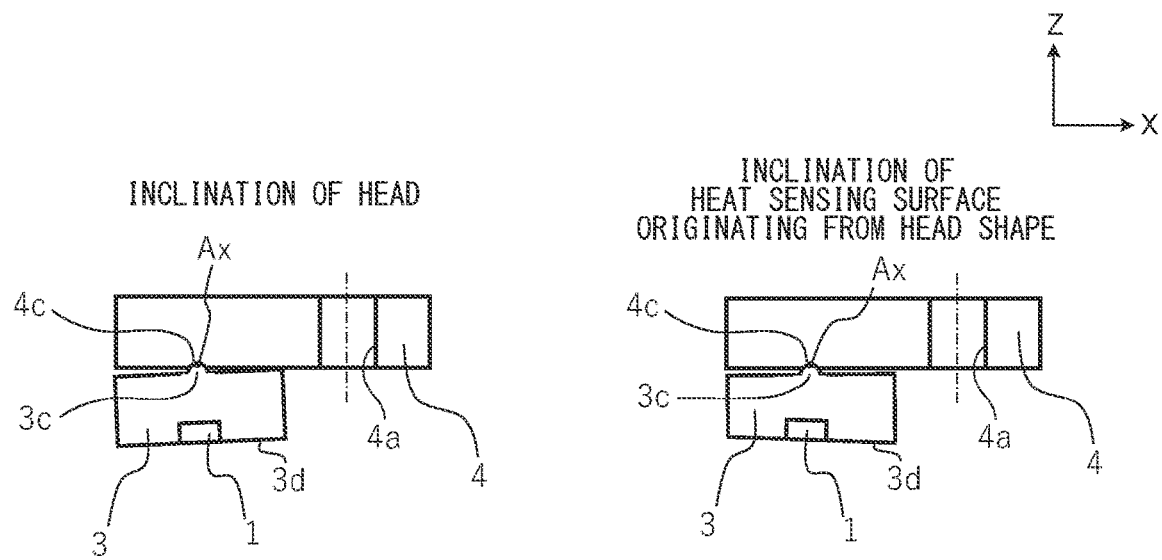
FIGS. 4A and 4B are each a schematic diagram for describing the temperature detection apparatus according to the first embodiment.

As illustrated on the left side of FIG. 4A, there is a case where the head member 3 is at an angle inclined with respect to the base member 4 before the temperature detection apparatus 105 is coupled to the fixing apparatus 100. In addition, as illustrated on the right side of FIG. 4A, there is a case where the shape of the head member 3 is a shape in which the heat sensing surface 3d is inclined with respect to the base member 4 due to a reason such as the dimensional tolerance or the like. The standard for the inclination mentioned herein is a virtual plane orthogonal to the axis (indicated by the one-dot chain line) of the positioning protrusion 9a that fits in the positioning hole 4a of the base member 4.

Figure 4B:
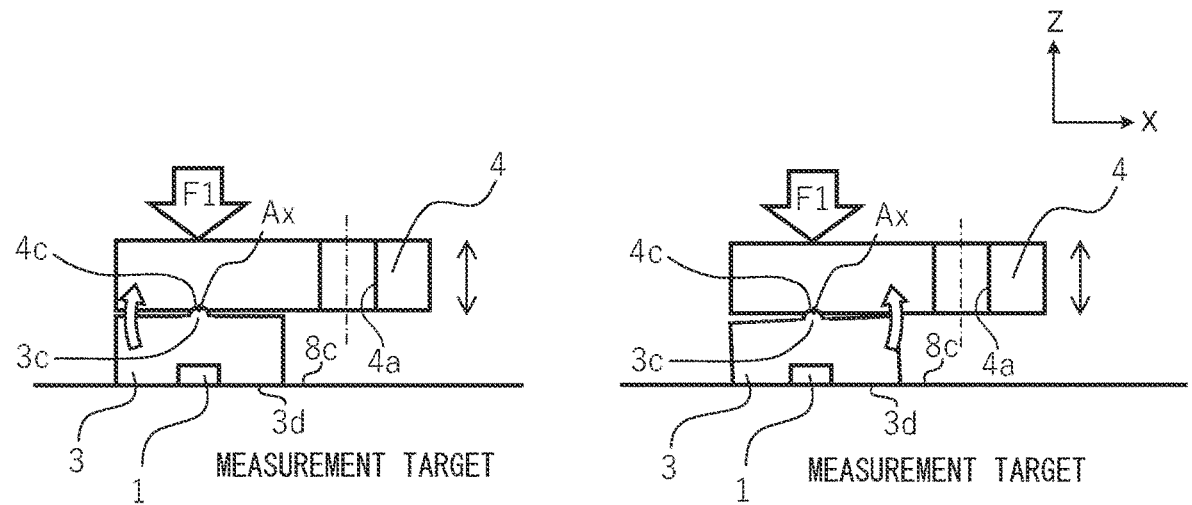

Even in the case where the heat sensing surface 3d of the head member 3 is inclined as illustrated in FIG. 4A, the heat sensing surface 3d of the head member 3 is pressed against the surface 8c of the heater 8 by an urging force F1 of the urging member 5 as illustrated in FIG. 4B when the temperature detection apparatus 105 is coupled to the fixing apparatus 100. At this time, the support portion 4c allows the head member 3 to tilt with respect to the base member 4 by using the support portion 4c as a fulcrum such that the heat sensing surface 3d of the head member 3 follows the surface 8c of the heater 8. In other words, the support portion allows the first holding member to tilt with respect to the second holding member by using the support portion as a fulcrum such that the first surface of the first holding member follows the second surface of the heater, as a result of the first holding member receiving the urging force of the urging member via the support portion. Further, in other words, by being urged toward the nip forming member (heater holder 9 and heater 8) by the urging force F1, the head member 3 tilts such that the first surface (heat sensing surface 3d) of the head member 3 to which the temperature detection element (detection element 1) is attached follows the second surface (surface 8c of the heater 8) of the nip forming member opposing the first surface.

As described above, as a result of the head member 3 being configured to be capable of tilting with respect to the base member 4, the heat sensing surface 3d of the head member 3 opposing the measurement target can be made approximately parallel (i.e., levelled) to the surface of the measurement target. As a result of this, the inclination of the heat sensing surface 3d of the head member 3 can be absorbed (equalized), and thus the temperature of the heater 8 can be detected with a high precision by using the detection element 1.

That is, according to the present embodiment, the positional precision of the detection element with respect to the measurement target can be improved with a simple configuration.

In addition, in the present embodiment, the base member 4 is positioned in the X direction and Y direction intersecting with the Z direction by the positioning hole 4a of the base member 4. Further, the base member 4 is allowed to move in the Z direction with respect to the heater holder 9 in a state in which the positioning hole 4a and the heater holder 9 are engaged with each other. That is, the positioning portion allows the second holding member to move in the first direction with respect to the heater holder in a state in which the second holding member is positioned in the second direction and third direction. As a result of this, the inclination of the heat sensing surface 3d can be more easily absorbed (equalized) by tilting the head member 3.

To be noted, even in the case where the heat sensing surface 3d of the head member 3 is inclined in a direction different from FIG. 4A, the inclination can be absorbed by tilting the head member 3. The movement direction and movement amount of the base member 4 in this case may be different from those of FIG. 4B.

In addition, as described above, in the present embodiment, the axis Ax about which the head member 3 tilts is positioned right under (on the +Z side of) the detection element 1 as illustrated in FIGS. 1B and 2. In other words, as viewed in the Z direction, the detection element 1 and the axis Ax of the head member 3 overlap with each other. When the head member 3 is pressed against the heater 8 by the urging force of the urging member 5, the head member 3 tilts such that a reaction force received from the heater 8 on one side in the X direction with respect to the axis Ax is balanced with a reaction force received from the heater 8 on the other side in the X direction with respect to the axis Ax. Therefore, in the case where the axis Ax is positioned right under (on the +Z side of) the detection element 1, the head member 3 tilts such that the heat sensing surface 3d becomes parallel to the surface 8c of the heater 8 in the vicinity of the detection element 1 even if, for example, the heat sensing surface 3d of the head member 3 is slightly curved. As a result of this, the positional precision of the detection element with respect to the measurement target can be further improved.

In addition, in the present embodiment, the detection element 1 is not fixed to the heat-resistant elastic member 32 unlike in the comparative example, and is supported by the metal plates 2a and 2b serving as flexible members. Therefore, the positional precision of the detection element 1 with respect to the heater 8 can be more easily secured. Specifically, it is assumed that, for example, in a state before the temperature detection apparatus 105 is coupled to the fixing apparatus 100, part of the detection element 1 or part of the metal plates 2a and 2b projects to the −Z side with respect to the end surface 3f of the head member 3 on the heater 8 side (−Z side) illustrated in FIG. 3A. Also in this case, when the temperature detection apparatus 105 is coupled to the fixing apparatus 100, the metal plates 2a and 2b are warped by the urging force of the urging member 5, and thus a state in which the surfaces 2f of the metal plates 2a and 2b are flush with the end surface 3f of the head member 3 can be realized.

In addition, since the metal plates 2a and 2b are exposed as the heat sensing surface 3d surrounding the detection element 1, a heat collecting effect from the measurement target is enhanced, and thus the thermal responsivity can be improved. In the present embodiment, since the area of the surfaces 2f of the metal plates 2a and 2b serving as the heat sensing surface 3d (opposing surface in contact with the measurement target with the heat-resistant coating 6 therebetween) is larger than the area of the detection element 1 as viewed from the measurement target side (−Z side), the heat collecting effect is greater. To be noted, although a layout in which the surfaces 2f of the metal plates 2a and 2b surround the detection element 1 from both sides in the X direction and both sides in the Y direction as viewed from the measurement target side (−Z side) is employed in the present embodiment, a layout in which the detection element 1 is surrounded in only one of the X direction or the Y direction may be employed.

In addition, in the present embodiment, a space 3s on the inside of the opening portion 3b of the head member 3 is present on the back side (+Z side, surface on the opposite side to the heater 8) of the detection element 1, and the detection element 1 is not in contact with another member as illustrated in FIG. 3B. Therefore, dissipation of heat from the detection element 1 is reduced by the thermal insulation effect of the air in the space 3s as compared with the configuration of the comparative example in which the heat-resistant elastic member 32 having a higher heat capacity than the air is present on the back side of the detection element 1. As a result, the thermal responsivity can be improved according to the present embodiment.

Modification Example

To be noted, although a plate spring has been described as an example of the urging member 5 in the present embodiment, a different spring member such as a coil spring or a wire spring may be used, and an elastic member (elastomer) may be used. To be noted, also in the case of using an elastic member (elastomer), since the head member 3 is interposed, the requirement for the heat resistance is lower than that of the heat-resistant elastic member 32 of the comparative example, and therefore a cheaper material can be used.

In addition, in the present embodiment, a configuration in which the base member 4 is allowed to move in the Z direction in a state in which the positioning hole 4a of the base member 4 is engaged with the positioning protrusion 9a of the heater holder 9 has been described. The configuration is not limited to this, and for example, a configuration in which the positioning hole 4a does not move in the Z direction with respect to the positioning protrusion 9a may be employed. Also in this case, the support portion 4c displaces in the Z direction due to the warpage of the base member 4 between the positioning hole 4a and the support portion 4c or a gap (backlash or play) between the positioning hole 4a and the positioning protrusion 9a, and thus the head member 3 can be pressed against the measurement target. In addition, as a result of the head member 3 tilting in the state of being pressed against the measurement target, the inclination of the heat sensing surface 3d of the head member 3 can be absorbed (equalized), and thus the temperature of the heater 8 can be detected with a higher precision by using the detection element 1.

In addition, in the present embodiment, a configuration in which the head member 3 tilts about the axis Ax of the Y direction intersecting with the X direction has been described in consideration of a case where the heat sensing surface 3d of the head member 3 is inclined in the X direction serving as the longitudinal direction of the head member 3 and the detection element 1. The configuration is not limited to this, and in the case where, for example, the heat sensing surface 3d of the head member 3 is expected to be inclined in the Y direction, the head member 3 may be configured to tilt about the axis extending in the X direction. The axis extending in the X direction in this case serves as an example of an axis extending in a second direction.

Second Embodiment

A temperature detection apparatus according to a second embodiment will be described. In the description below, elements denoted by the same reference signs as in the first embodiment have substantially the same configurations and functions as those described in the first embodiment unless otherwise described, and part different from the first embodiment will be mainly described.

Figure 6:
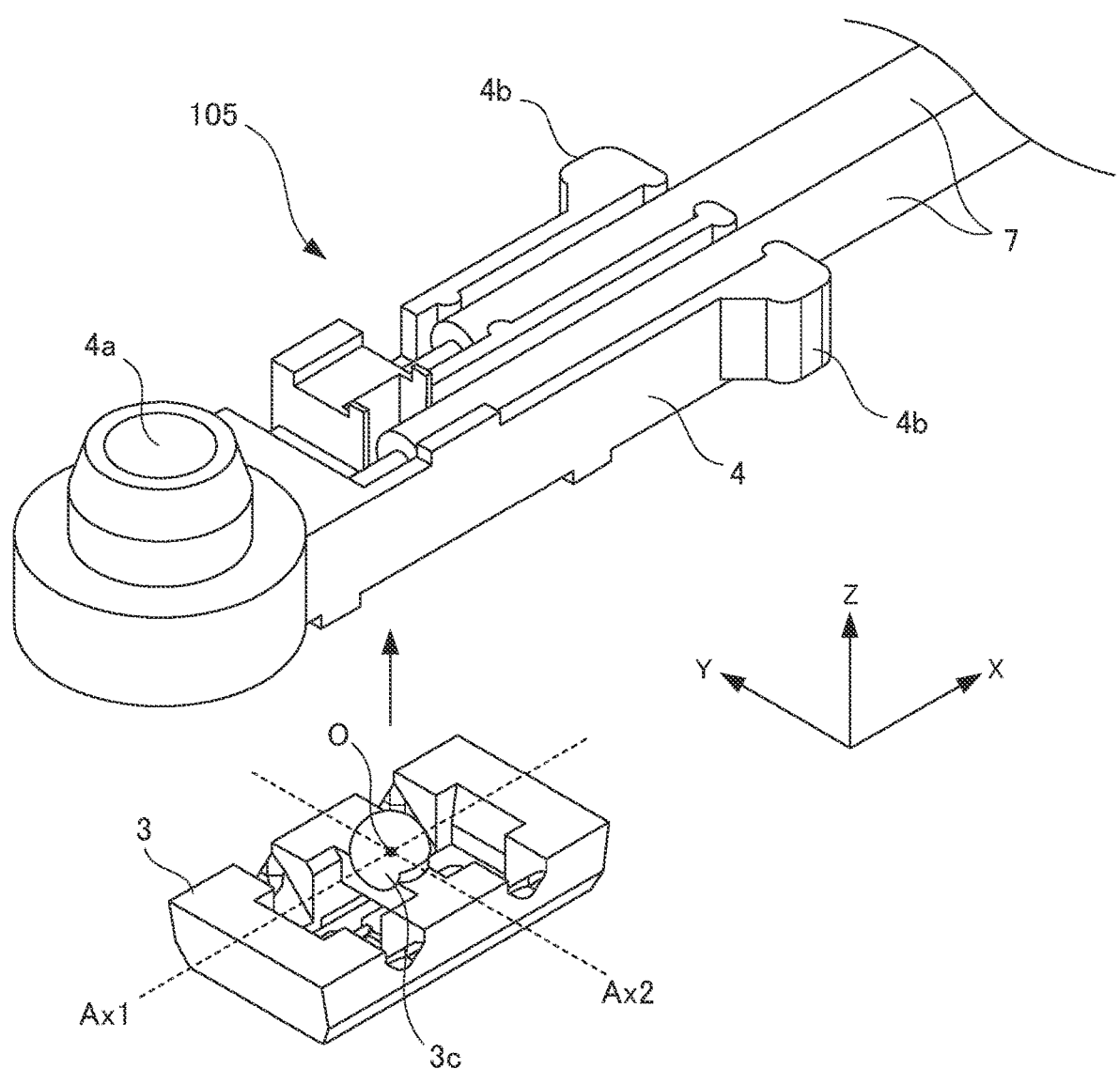
FIG. 6 is an exploded view of the temperature detection apparatus according to the second embodiment.

FIG. 5A is a plan view of the temperature detection apparatus 105 according to the second embodiment. FIG. 5B is a section view of the temperature detection apparatus 105 illustrating a cross-section taken along a plane indicated by a line A-A of FIG. 5A. FIG. 5C is a section view of the temperature detection apparatus 105 illustrating a cross-section taken along a plane indicated by a line B-B of FIG. 5A. FIG. 6 is an exploded view of the temperature detection apparatus 105 according to the second embodiment.

As illustrated in FIGS. 5A to 5C and 6, the head member 3 has a supported portion 3c having a projection shape provided to project toward the base member 4 side (+Z side) in the Z direction, and the base member 4 has a support portion 4c having a recess shape that fits with this projection shape. The projection shape in the present embodiment is part of a spherical surface, and the recess shape is a concave surface that fits with this spherical surface. The head member 3 (first holding member) of the present embodiment is held by the base member 4 (second holding member) via a ball joint including the supported portion 3c having an approximate spherical shape and the support portion 4c having a concave surface shape.

According to the ball joint configuration described above, the head member 3 can tilt in an arbitrary direction about a center O of the spherical surface of the supported portion 3c illustrated in FIG. 6 with respect to the base member 4. That is, the head member 3 is capable of tilting about an axis Ax1 of the X direction intersecting with the Z direction, and about an axis Ax2 of the Y direction intersecting with both the Z direction and the X direction with respect to the base member 4.

Also in the present embodiment, the head member 3 holding the detection element 1 is urged toward the heater 8 serving as a measurement target by the urging force of the urging member 5 via the support portion 4c of the base member 4. The support portion 4c allows the head member 3 to tilt with respect to the base member 4 about the axes Ax1 and Ax2 of the directions intersecting with the urging direction of the urging member 5 (Z direction).

According to this configuration, in a state in which the head member 3 is pressed against the heater 8 serving as a measurement target by the urging force of the urging member 5, the head member 3 is capable of tilting such that the heat sensing surface 3d of the head member 3 follows the surface 8c of the heater 8. In other words, the support portion allows the first holding member to tilt about the second holding member by using the support portion as a fulcrum such that the first surface of the first holding member follows the second surface of the heater, as a result of the first holding member receiving the urging force of the urging member via the support portion. Therefore, the inclination of the heat sensing surface 3d of the head member 3 before coupling to the fixing apparatus 100 can be absorbed (equalized), and the temperature of the heater 8 can be detected with a higher precision by using the detection element 1.

That is, also according to the present embodiment, the positional precision of the detection element with respect to the measurement target can be improved with a simple configuration.

In addition, according to the present embodiment, the head member 3 is capable of tilting about the axis Ax1 of the X direction and about the axis Ax2 of the Y direction with respect to the base member 4. That is, the support portion 4c of the present embodiment allows the first holding member to tilt about the second holding member about the axis extending in the second direction intersecting with the first direction and about the axis extending in the third direction intersecting with both the first direction and the second direction. As a result of this, the inclination of the heat sensing surface 3d of the head member 3 in an arbitrary direction can be absorbed (equalized).

Also in the present embodiment, it is preferable that the support portion 4c of the base member 4 and the supported portion 3c of the head member 3 are positioned right under (on the +Z side of) the detection element 1 in the Z direction in which the detection element 1 opposes the heater 8. In other words, it is preferable that the detection element 1 overlaps with an intersection of the axis Ax1 of the X direction and the axis Ax2 of the Y direction about which the head member 3 tilt (center O of the supported portion 3*c*, see FIG. 6), as viewed in the Z direction. As a result of this, the head member 3 tilts such that the heat sensing surface 3*d* in the vicinity of the detection element 1 becomes closer to parallel to the surface of the measurement target, and therefore the positional precision of the detection element with respect to the measurement target can be further improved.

Modification Example

Although a configuration in which the supported portion 3*c* of the head member 3 has a projection shape and the support portion 4*c* of the base member 4 has a recess shape has been described in the second embodiment, a configuration in which the supported portion 3*c* of the head member 3 has a recess shape and the support portion 4*c* of the base member 4 has a projection shape may be employed. That is, it suffices as long as one of the support portion or the supported portion has a projection shape provided to project toward the other of the support portion or the supported portion in the first direction and the other of the support portion or the supported portion has a recess shape that fits with the projection shape.

In addition, although a configuration in which the projection shape is part of a spherical surface and the recess shape is a concave surface following the spherical surface has been described as an example in the second embodiment, the projection shape is not limited to a spherical surface, and the recess shape is not limited to a concave surface following the spherical surface, as long as these shapes allow the head member 3 to tilt.

Third Embodiment

A temperature detection apparatus according to a third embodiment will be described. In the description below, elements denoted by the same reference signs as in the first embodiment have substantially the same configurations and functions as those described in the first embodiment unless otherwise described, and part different from the first embodiment will be mainly described.

Figure 7C:
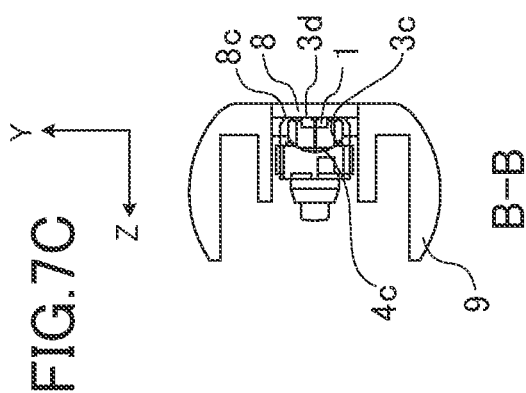
FIGS. 7B and 7C are each a section view of the temperature detection apparatus according to the third embodiment.
Figure 7A:
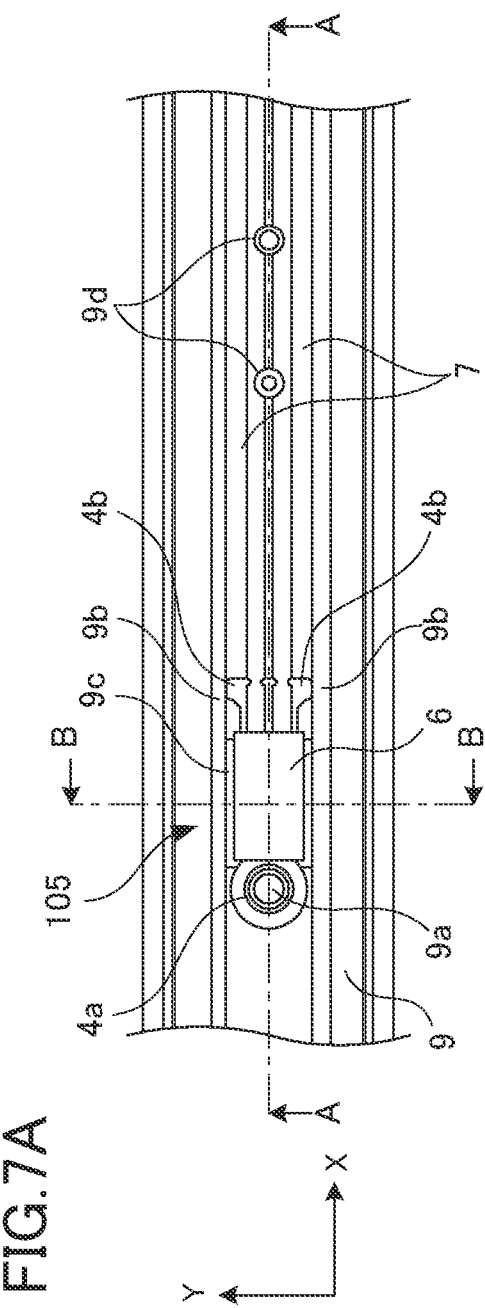
FIG. 7A is a plan view of a temperature detection apparatus according to a third embodiment.
Figure 7B:
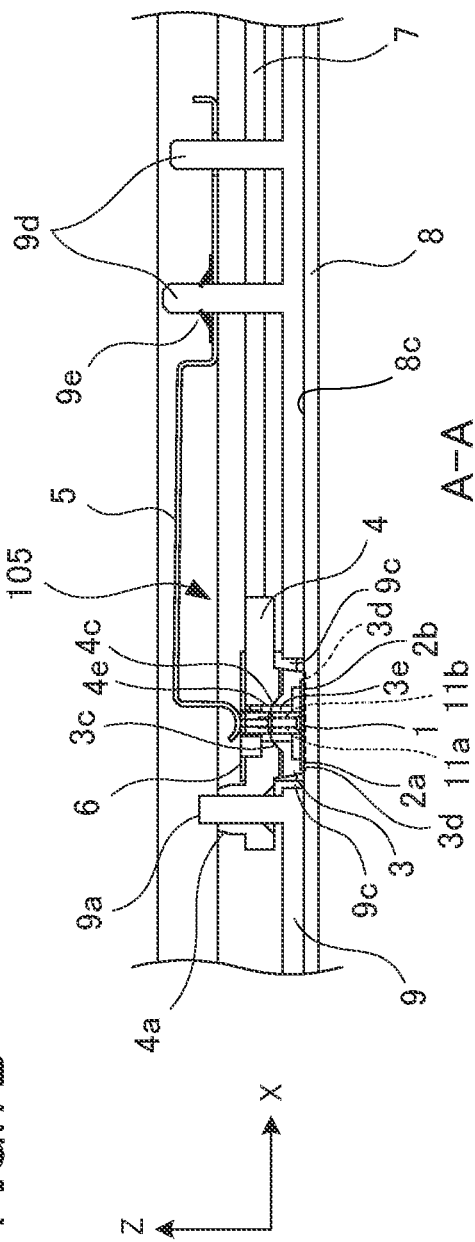
Figure 8:
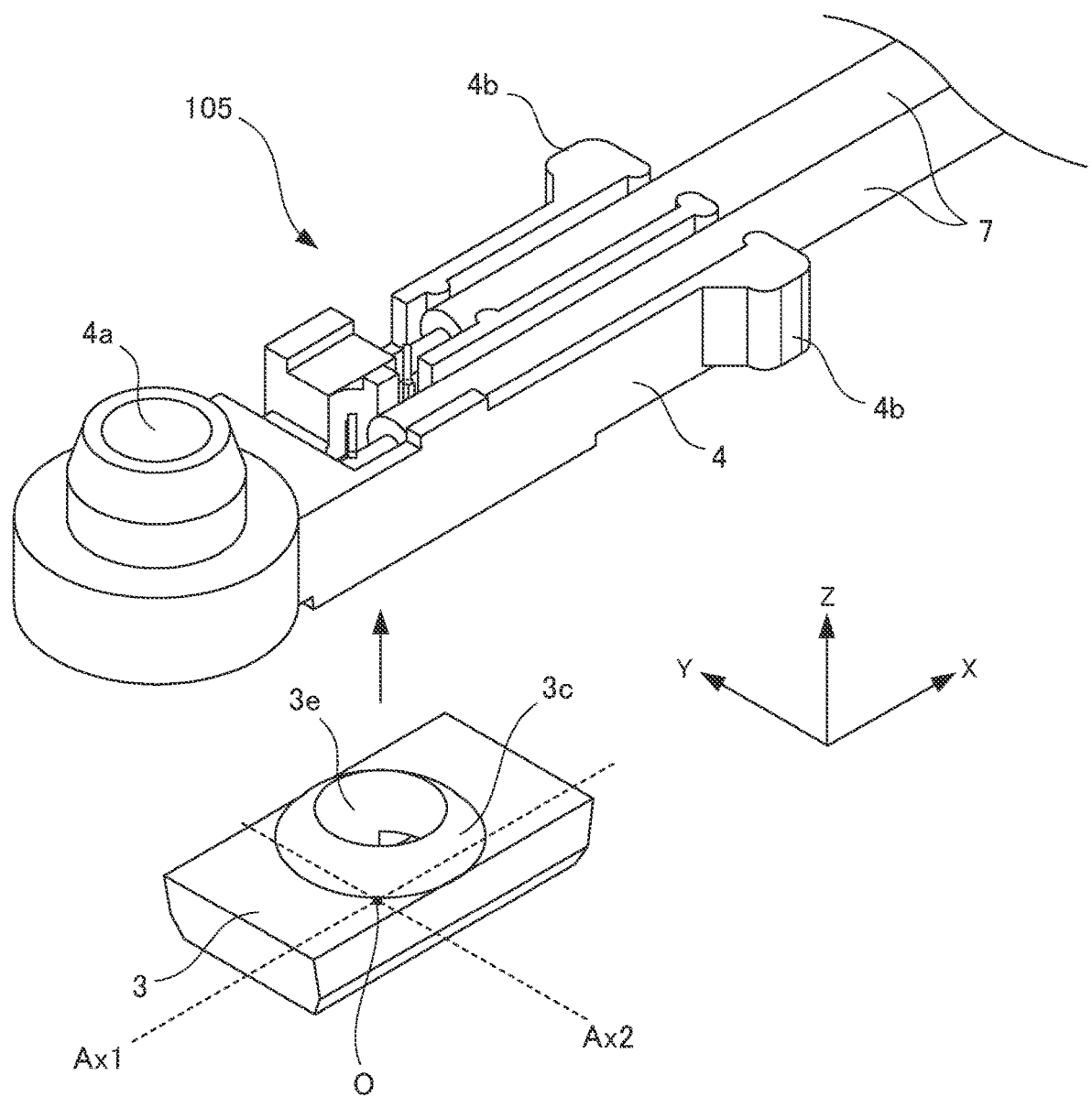
FIG. 8 is an exploded view of the temperature detection apparatus according to the third embodiment.

FIG. 7A is a plan view of the temperature detection apparatus 105 according to the third embodiment. FIG. 7B is a section view of the temperature detection apparatus 105 illustrating a cross-section taken along a plane indicated by a line A-A of FIG. 7A. FIG. 7C is a section view of the temperature detection apparatus 105 illustrating a cross-section taken along a plane indicated by a line B-B of FIG. 7A. FIG. 8 is an exploded view of the temperature detection apparatus 105 according to the third embodiment.

As illustrated in FIGS. 7A, 7B, and 8, the head member 3 has a supported portion 3*c* having a projection shape provided to project toward the base member 4 side (+Z side) in the Z direction, and the base member 4 has a support portion 4*c* having a recess shape that fits with this projection shape. The projection shape in the present embodiment is part of a spherical surface, and the recess shape is a concave surface that fits with this spherical surface.

Unlike in the second embodiment, in the supported portion 3*c* of the present embodiment, a hole 3*e* (first hole) is provided at a center portion of the projection shape as viewed in the Z direction. In addition, a hole 4*e* (second hole) is provided at a center portion of the recess shape of the support portion 4*c* as viewed in the Z direction. The projection shape of the supported portion 3*c* and the recess shape of the support portion 4*c* have a larger diameter than the projection shape of the supported portion 3*c* and the recess shape of the support portion 4*c* of the second embodiment. The support portion 4*c* can be referred to as a mortar shape with the hole 4*e* at the center portion thereof.

According to the support configuration described above, the head member 3 can tilt in an arbitrary direction about the center O of the spherical surface of the supported portion 3*c* illustrated in FIG. 8 with respect to the base member 4. That is, the head member 3 is capable of tilting about the axis Ax1 of the X direction intersecting with the Z direction, and about the axis Ax2 of the Y direction intersecting with both the Z direction and the X direction with respect to the base member 4.

In the present embodiment, dumet wires 11*a* and 11*b* are provided through the hole 3*e* of the supported portion 3*c* and the hole 4*e* of the support portion 4*c* as illustrated in FIG. 7B. That is, the dumet wires 11*a* and 11*b* (conductive wires) electrically interconnecting the detection element 1 held by the head member 3 (first holding member) and terminals of the harnesses 7 (wiring) held by the base member 4 (second holding member) are provided through the holes 3*e* and 4*e* (first hole and second hole). As described above, the design flexibility can be improved by utilizing the space at the center portions of the support portion 4*c* and the supported portion 3*c* whose diameters are increased. In addition, since the wiring path of the dumet wires 11*a* and 11*b* extend through the vicinity of the center of the support portion 4*c* and the supported portion 3*c* illustrated in FIGS. 7B and 7C as viewed in the Z direction, the risk of breakage of the dumet wires 11*a* and 11*b* during tilting of the head member 3 can be reduced.

Also in the present embodiment, the head member 3 holding the detection element 1 is urged toward the heater 8 serving as a measurement target by the urging force of the urging member 5 via the support portion 4*c* of the base member 4. The support portion 4*c* allows the head member 3 to tilt with respect to the base member 4 about the axes Ax1 and Ax2 of the directions intersecting with the urging direction of the urging member 5 (Z direction).

According to this configuration, in a state in which the head member 3 is pressed against the heater 8 serving as a measurement target by the urging force of the urging member 5, the head member 3 is capable of tilting such that the heat sensing surface 3*d* of the head member 3 follows the surface 8*c* of the heater 8. In other words, the support portion allows the first holding member to tilt about the second holding member by using the support portion as a fulcrum such that the first surface of the first holding member follows the second surface of the heater, as a result of the first holding member receiving the urging force of the urging member via the support portion. Therefore, the inclination of the heat sensing surface 3*d* of the head member 3 before coupling to the fixing apparatus 100 can be absorbed (equalized), and the temperature of the heater 8 can be detected with a higher precision by using the detection element 1.

That is, also according to the present embodiment, the positional precision of the detection element with respect to the measurement target can be improved with a simple configuration.

In addition, according to the present embodiment, the head member 3 is capable of tilting about the axis Ax1 of the X direction and about the axis Ax2 of the Y direction with respect to the base member 4. That is, the support portion 4c of the present embodiment allows the first holding member to tilt about the second holding member about the axis extending in the second direction intersecting with the first direction and about the axis extending in the third direction intersecting with both the first direction and the second direction. As a result of this, the inclination of the heat sensing surface 3d of the head member 3 in an arbitrary direction can be absorbed (equalized).

Also in the present embodiment, it is preferable that the support portion 4c of the base member 4 and the supported portion 3c of the head member 3 are positioned right under (on the +Z side of) the detection element 1 in the Z direction in which the detection element 1 opposes the heater 8. In other words, it is preferable that the detection element 1 overlaps with an intersection of the axis Ax1 of the X direction (first axis) and the axis Ax2 of the Y direction (second axis) about which the head member 3 tilt (center O of the supported portion 3c, see FIG. 8), as viewed in the Z direction. As a result of this, the head member 3 tilts such that the heat sensing surface 3d in the vicinity of the detection element 1 becomes closer to parallel to the surface of the measurement target, and therefore the positional precision of the detection element with respect to the measurement target can be further improved.

Modification Example

Although a configuration in which the supported portion 3c of the head member 3 has a projection shape and the support portion 4c of the base member 4 has a recess shape has been described in the third embodiment, a configuration in which the supported portion 3c of the head member 3 has a recess shape and the support portion 4c of the base member 4 has a projection shape may be employed. That is, it suffices as long as one of the support portion or the supported portion has a projection shape provided to project toward the other of the support portion or the supported portion in the first direction and the other of the support portion or the supported portion has a recess shape that fits with the projection shape.

In addition, although a configuration in which the projection shape is part of a spherical surface and the recess shape is a concave surface following the spherical surface has been described as an example in the third embodiment, the projection shape is not limited to a spherical surface, and the recess shape is not limited to a concave surface following the spherical surface, as long as these shapes enable the head member 3 to tilt.

Other Embodiments

In the embodiments described above, an image forming apparatus including a process unit PU of a direct transfer type as an image forming means or image forming portion has been described as an example. The configuration is not limited to this, and the present technique may be applied to an image forming apparatus including a process unit of an intermediate transfer type in which a toner image formed on an image bearing member is transferred onto an intermediate transfer member through primary transfer and is then transferred from the intermediate transfer member onto a recording material. In addition, the image forming means (image forming portion) may have a configuration in which a plurality of toner images formed on a plurality of image bearing members respectively by using toners of different colors are superimposed on each other on the recording material, and thus a color image can be formed.

In addition, in the embodiments described above, a fixing apparatus of a film heating system in which a tubular film 101 is used as a fixing member, a pressurizing roller 102 is used as a pressurizing member, and a heater 8 that is a ceramic heater is used as a heating means or heating mechanism has been described as an example. The fixing apparatus is not limited to this, and for example, a roller having a cylindrical shape may be used as the fixing member. In addition, the heating means (heating mechanism) is not limited to a ceramic heater, and a halogen lamp that emits radiant heat, an induction heating mechanism that generates heat in a conductive layer in the fixing member by induction heating, or the like may be used. In addition, the measurement target of the temperature detection apparatus 105 is not limited to the heater 8.

According to the present disclosure, the positional precision of the detection element can be improved with a simple configuration.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-204882, filed on Dec. 21, 2022, which is hereby incorporated by reference herein in its entirety.

What is claimed is:

1. A fixing apparatus configured to fix a toner image to a recording material in a nip portion, the fixing apparatus comprising:
a first rotary member;
a nip forming member provided in an inner space of the first rotary member;
a second rotary member configured to be in contact with an outer circumferential surface of the first rotary member such that the first rotary member is interposed between the second rotary member and the nip forming member, and thus form the nip portion between the first rotary member and the second rotary member;
a temperature detection element configured to detect a temperature of the nip forming member;
a holder configured to hold the temperature detection element; and
an urging member configured to urge the holder toward the nip forming member to bring the holder into contact with the nip forming member,
wherein the holder includes
a base member configured to receive an urging force from the urging member, and
a head member to which the temperature detection element is attached, the head member being configured to be in contact with the base member and tiltable with respect to the base member with a contact portion between the head member and the base member as a fulcrum, and
wherein the head member is configured to be urged toward the nip forming member by the urging force and to tilt following a portion of the nip forming member opposing the head member,
wherein the nip forming member includes
a heater that is provided with a heating element configured to heat the nip portion and has a plate shape elongated in a longitudinal direction, and a heater holder configured to hold the heater and form the nip portion, and wherein the base member is engaged with the heater holder to be positioned in the longitudinal direction and a short direction of the heater with respect to the heater holder, while the base member is allowed to move in a thickness direction of the heater with respect to the heater holder.

2. The fixing apparatus according to claim 1, wherein the head member has a first surface on which the temperature detection element is disposed, wherein the portion of the nip forming member is a second surface opposing the first surface, and wherein the head member is configured to be urged toward the nip forming member by the urging force and to tilt such that the first surface becomes closer to parallel to the second surface.

3. The fixing apparatus according to claim 1, wherein the head member is configured to tilt about an axis extending in the short direction with respect to the base member.

4. The fixing apparatus according to claim 3, wherein the temperature detection element is attached to a position overlapping with the axis extending in the short direction as viewed in the thickness direction.

5. The fixing apparatus according to claim 1, wherein the head member is configured to tilt about a first axis extending in the longitudinal direction and about a second axis extending in the short direction with respect to the base member.

6. The fixing apparatus according to claim 5, wherein the temperature detection element is attached to a position overlapping with an intersection of the first axis and the second axis as viewed in the thickness direction.

7. The fixing apparatus according to claim 1, wherein one of the base member or the head member has a projection portion, and wherein another of the base member or the head member has a recess portion configured to engage with the projection portion at the contact portion.

8. The fixing apparatus according to claim 7, wherein the projection portion is part of a spherical surface, and wherein the recess portion is part of a concave surface following the spherical surface.

9. The fixing apparatus according to claim 1, wherein the temperature detection element is a thermistor.

10. The fixing apparatus according to claim 1, wherein the base member and the head member are formed from a resin material.

11. The fixing apparatus according to claim 1, wherein the first rotary member is a tubular film, wherein the second rotary member is a pressurizing roller configured to be in contact with an outer surface of the film, and wherein the film heated by the heater heats the toner image on the recording material while nipping and conveying the recording material in the nip portion between the heater and the pressurizing roller, and thus fixes the toner image to the recording material.

12. An image forming apparatus comprising:

an image forming portion configured to form a toner image on a recording material;

the fixing apparatus according to claim 1 configured to fix the toner image formed by the image forming portion to the recording material; and a controller configured to control power to be supplied to the heating element on a basis of the temperature detected by the temperature detection element.

13. A temperature detection apparatus comprising:

a temperature detection element configured to oppose a measurement target in a predetermined direction and detect a temperature of the measurement target; and a holder configured to hold the temperature detection element, wherein the holder includes
 a base member, and
 a head member to which the temperature detection element is attached, the head member being configured to be in contact with the base member and tiltable with respect to the base member with a contact portion between the head member and the base member as a fulcrum, wherein the head member is configured to tilt to follow a portion of the measurement target opposing the head member in a case of being urged toward the measurement target by an urging force received via the base member, and wherein in a case where a direction orthogonal to the predetermined direction is referred to as a first direction, and a direction orthogonal to the predetermined direction and the first direction is referred to as a second direction, the base member is positioned in the first direction and the second direction with respect to the measurement target, while the base member is allowed to move in the predetermined direction.

14. The temperature detection apparatus according to claim 13, wherein the head member has a first surface on which the temperature detection element is disposed, wherein the portion of the measurement target is a second surface opposing the first surface, and wherein the head member is configured to be urged toward the measurement target by the urging force, and to tilt such that the first surface becomes closer to parallel to the second surface.

15. The temperature detection apparatus according to claim 5, wherein the head member is configured to tilt about an axis extending in the second direction with respect to the base member.

16. The temperature detection apparatus according to claim 15, wherein the temperature detection element is attached to a position overlapping with the axis extending in the second direction as viewed in the predetermined direction.

17. The temperature detection apparatus according to claim 15, wherein the head member is configured to tilt about a first axis extending in the first direction and about a second axis extending in the second direction with respect to the base member.

18. The temperature detection apparatus according to claim 17, wherein the temperature detection element is attached to a position overlapping with an intersection of the first axis and the second axis as viewed in the predetermined direction.

19. The temperature detection apparatus according to claim 14, wherein one of the base member or the head member has a projection portion, and wherein another of the base member or the head member has a recess portion configured to engage with the projection portion at the contact portion.

20. The temperature detection apparatus according to claim 19,
wherein the projection portion is part of a spherical surface, and
wherein the recess portion is part of a concave surface following the spherical surface.

21. The temperature detection apparatus according to claim 14,
wherein the base member and the head member are formed from a resin material.

22. The temperature detection apparatus according to claim 14,
wherein the temperature detection element is a thermistor.

* * * * *